United States Patent
Wang et al.

(10) Patent No.: US 6,981,073 B2
(45) Date of Patent: Dec. 27, 2005

(54) MULTIPLE CHANNEL DATA BUS CONTROL FOR VIDEO PROCESSING

(75) Inventors: Xu Wang, Fremont, CA (US); Shuhua Xiang, Fremont, CA (US); Li Sha, San Jose, CA (US)

(73) Assignee: WIS Technologies, Inc., Santa Clara, CA (US)

(*) Notice: Subject to any disclaimer, the term of this patent is extended or adjusted under 35 U.S.C. 154(b) by 754 days.

(21) Appl. No.: 10/033,324

(22) Filed: Nov. 2, 2001

(65) Prior Publication Data

US 2005/0216608 A1 Sep. 29, 2005

Related U.S. Application Data

(60) Provisional application No. 60/309,239, filed on Jul. 31, 2001.

(51) Int. Cl.[7] .............................................. G06F 13/28
(52) U.S. Cl. .......................... 710/28; 710/14; 710/27; 710/38
(58) Field of Search .............................. 710/14, 22, 23, 710/24, 25, 26, 27, 28

(56) References Cited

U.S. PATENT DOCUMENTS

| | | | |
|---|---|---|---|
| 5,228,130 A * | 7/1993 | Michael | 710/8 |
| 5,299,144 A | 3/1994 | Bartkowiak et al. | |
| 5,361,220 A | 11/1994 | Asano | |
| 5,398,078 A | 3/1995 | Masuda et al. | |
| 5,633,897 A | 5/1997 | Fettweis et al. | |
| 5,694,127 A | 12/1997 | Tayama | |
| 5,706,001 A | 1/1998 | Sohn | |
| 5,706,002 A | 1/1998 | Meehan et al. | |
| 5,799,201 A | 8/1998 | Lorenz et al. | |
| 5,835,145 A | 11/1998 | Ouyang et al. | |
| 5,941,940 A | 8/1999 | Prasad et al. | |
| 6,038,675 A | 3/2000 | Gabzdyl et al. | |
| RE37,048 E | 2/2001 | McCollum | |
| 6,209,017 B1 | 3/2001 | Lim et al. | |
| 6,243,734 B1 | 6/2001 | Doshi et al. | |
| 6,407,680 B1 | 6/2002 | Lai et al. | |
| 6,421,695 B1 | 7/2002 | Bae et al. | |
| 6,463,445 B1 | 10/2002 | Suzuki et al. | |
| 6,507,293 B2 | 1/2003 | Deeley et al. | |
| 6,516,031 B1 | 2/2003 | Ishihara et al. | |
| 6,523,071 B1 * | 2/2003 | Klinger et al. | 710/10 |
| 6,552,673 B2 | 4/2003 | Webb | |
| 6,587,057 B2 | 7/2003 | Scheuermann | |
| 6,593,860 B2 | 7/2003 | Lai et al. | |
| 6,647,061 B1 | 11/2003 | Panusopone et al. | |
| 6,701,405 B1 * | 3/2004 | Adusumilli et al. | 710/308 |
| 6,728,862 B1 | 4/2004 | Wilson | |
| 2001/0016884 A1 * | 8/2001 | Sato et al. | 710/29 |
| 2002/0199040 A1 * | 12/2002 | Irwin et al. | 710/22 |
| 2003/0014457 A1 | 1/2003 | Desai et al. | |

* cited by examiner

*Primary Examiner*—Kim Huynh
*Assistant Examiner*—Alan S. Chen
(74) *Attorney, Agent, or Firm*—Fenwick & West LLP

(57) ABSTRACT

A method, apparatus, computer medium, and other embodiments for selectably enabling a plurality of data transfer modes along one or more channels are described. In one embodiment, data transfer between a first device and a second device is controlled based on selecting a combination of access and operation modes. In another embodiment, a video processing system capable of selectably enabling a plurality of data transfer modes along one or more channels is described.

33 Claims, 23 Drawing Sheets

MULTIPLE CHANNEL DATA BUS CONTROL FOR VIDEO PROCESSING

CROSS-REFERENCE TO RELATED APPLICATION

This application claims priority under 35 U.S.C. § 119(e) to co-pending U.S. Provisional Patent Application No. 60/309,239, entitled "Video Processing System with Flexible Video Format," filed Jul. 31, 2001, by He Ouyang, et al., the subject matter of which is incorporated by reference in its entirety herein.

TECHNICAL FIELD

The present invention relates generally to video processing, and in particular to selectably enabling data transfer modes between devices and storage elements in a video compression system.

BACKGROUND OF THE INVENTION

Data transfers typically involving input/output (I/O) devices give rise to overhead that consumes much of a central processing unit's (CPU's or processor's) resources. For example, data transfers between I/O devices and memory may consume 25% of the processor resources, and may increase when data transfers consists primarily of relatively large blocks of data (e.g., hundreds to thousands of bytes). Fortunately, conventional direct memory access (DMA) controllers typically off-load control of the bus system from the processor during data transfers amongst storage elements, system devices and I/O devices.

Although conventional DMA controllers enable the processor to relinquish control of the bus system, they fail to adequately accommodate those data processing systems requiring different types of data transfers amongst memory device and other system and I/O devices. In such data processing systems, such as a video processing system, data transfers between a memory device and motion compensation engine can require different data configuration parameters compared with the data configuration parameters for data transfers amongst a variable length encoding device and an I/O memory device. Conventionally, because the data transfers between different devices, like the motion compensation engine and the variable length encoding device, typically require different configuration parameters, different configuration parameters are typically loaded one at a time and on-the-fly with each change in configuration of the data transfer. This detrimentally adds processing overhead to the data transfer. Accordingly, what is needed is a mechanism to accommodate the multiple types of data transfers and to select different configuration parameters for different types of data transfers without these drawbacks.

Conventional DMA controllers typically accommodate sequential bursts of data. The burst will specify starting and ending addresses for the data transfer, along with the length of the transfer (known as the burst length). The reprogramming of these parameters for each data transfer is problematic because even though only a portion of the block of data may be of interest, the entire block of data must be transferred. One obvious problem is that the overhead involved becomes intolerable when large amounts of video data are involved in the data transfer, yet only a small portion is actually used. This overhead is unacceptable for smaller integrated circuit applications, like those associated with video processors for hand-held or portable multimedia devices. Processing speed is thus sacrificed without DMA controllers; and additionally, data transfer speed is impeded with conventional sequential burst data transfer techniques. Thus, what is needed is a manner of transferring only the data of interest and with improved speed, as opposed to having to load the starting and ending addresses and the burst length of the entire set of data, including data that is not of interest.

It would also be beneficial if there were a way to notify the DMA controller that the data transfer has ended without having to specify those parameters involving the ending address, and the burst length with each data transfer. Doing so would minimize the amount of reprogramming that conventional DMA controllers require.

Also, conventional DMA controllers suffer from the penalty involved with having to reconfigure a data channel when an upper limit of a memory address is reached. This reconfiguration also results in an interruption of the input/output (I/O) transfer. Accordingly, what is needed is a manner in which to avoid this reconfiguration when an upper limit is reached.

SUMMARY OF THE INVENTION

The present invention overcomes the deficiencies and limitations of the prior art by providing a system for selectably enabling multiple channel data transfer modes between source and destination devices.

One aspect of this system in accordance with the present invention includes a method of controlling data transfer between a first device and a second device. The method includes receiving a command to initiate the data transfer, and extracting configuration data from the command to load a configuration engine. The extracted configuration data functions to index operational characteristics associated with the data transfer. Additionally, the method includes selecting: a channel from the operational characteristics, wherein the channel facilitates the data transfer between the first device and the second device; and an operation and access mode associated with the data transfer. At least one signal is received to indicate that the data transfer is ready to be undertaken. The channel is then activated so as to enable the data transfer using the operation and access mode selected. As will become clear from the detailed description to follow, one advantage of the present invention is that different data bus configurations associated with different types of data transfers no longer need to be loaded one at a time as with the prior art, thereby reducing the processing overhead associated with the data transfer.

Another aspect in accordance with the present invention includes a method of direct memory access control. This method includes receiving a command to initiate data transfer between a first device and a second device, and responsive to the command received, determining a channel capable of facilitating the data transfer. The method further includes determining a mode indicating a manner in which to activate the channel, and enabling the data transfer to be performed using the channel and based on the mode determined.

In one embodiment of the present invention, either of the first or second devices comprises a memory device. In another embodiment in accordance with the present invention, there is provided a novel video processing system that works well with the system for selectably enabling a plurality of data transfer modes along one or more channels communicatively coupling together a first device and a second device. One benefit of the present invention is that different configurations associated with the different data transfers within a video processing system can be efficiently accommodated without additional reprogramming of different configuration data as with the prior art.

Further, in another embodiment, a system for selectably enabling a plurality of data transfer modes is described and includes a direct memory access controller controlling data transfer between the first and second devices. The direct memory access controller includes a configuration storage element having a multiple segment indicator, a base request indicator, a base count indicator, and a mode indicator. An advantage of using a configuration storage element is that both contiguous and non-contiguous blocks of data may be transferred without having to reload configuration protocols, thereby improving the overall time taken for the data transfer. Additionally, since configuration data does not need to be loaded on-the-fly with each change in configuration associated with different data transfers, one advantage of the present invention minimizes the chances of data becoming lost during conventional on-the-fly loading requirements.

The features and advantages described in this summary and the following detailed description are not all-inclusive, and particularly, many additional features and advantages will be apparent to one of ordinary skill in the art in view of the drawings, specification and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

BRIEF DESCRIPTION OF THE DRAWINGS

The teachings of the present invention can be readily understood by considering the following detailed description in conjunction with the accompanying drawings.

Figure 1:
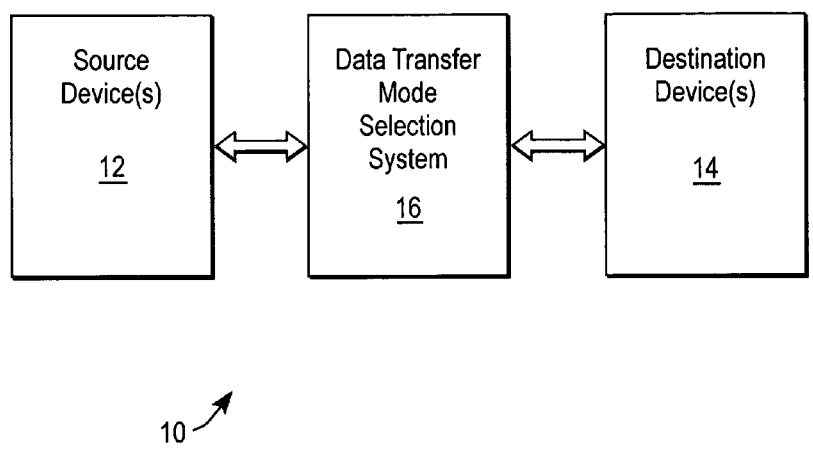
FIG. 1 is a block diagram of a data transfer selection mode system in accordance with the present invention.

The figures depict a preferred embodiment of the present invention for purposes of illustration only. One skilled in the art will readily recognize from the following discussion that alternative embodiments of the structures and methods illustrated herein may be employed without departing from the principles of the invention described herein.

DETAILED DESCRIPTION OF EMBODIMENTS

Introduction

A system, method, and other embodiments for selectably enabling a plurality of data transfer modes along one or more channels between devices and between a memory device and other devices are described. In the following description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention with unnecessary details.

Reference in the specification to "one embodiment" or to "an embodiment" means that a particular feature, structure, or characteristic described in connection with the embodiments is included in at least one embodiment of the invention. The appearances of the phrase "in one embodiment" in various places in the specification are not necessarily all referring to the same embodiment.

Some portions of the detailed description that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It has proven convenient at times, principally for reasons of common usage, to refer to these signals as bits, values, elements, symbols, characters, terms, numbers, or the like. Furthermore, it has also proven convenient at times, to refer to certain arrangements of steps requiring physical manipulations of physical quantities as (modules) code devices, without loss of generality.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or determining" or "displaying" or the like, refer to the action and processes of a computer system, or similar electronic computing device, that manipulates and transforms data represented as physical (electronic) quantities within the computer-based system memories or registers or other such information storage, transmission or display devices.

One aspect in accordance with the present invention includes an embodiment of the process steps and instructions described herein in the form of hardware. Alternatively, the process steps and instructions of the present invention could be embodied in firmware or a computer program (software), and when embodied in software, could be downloaded to reside on and be operated from different platforms used by video processing systems and multimedia devices employed with real time network operating systems and applications.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and displays presented herein are not inherently related to any particular computer or other apparatus. Various general-purpose systems may also be used with programs in accordance with the teachings herein, or it may prove convenient to construct a more specialized apparatus to perform the required method steps. The required structure for a variety of these systems will appear from the description below. In addition, the present invention is not described with reference to any particular programming language. It will be appreciated that a variety of programming languages may be used to implement the teachings of the present invention as described herein, and any references below to specific languages are provided for disclosure of enablement and best mode of the present invention.

Reference will now be made in detail to several embodiments of the present invention, examples of which are illustrated in the accompanying drawings. Wherever practicable, the same reference numbers will be used throughout the drawings to refer to the same or like parts to avoid obscuring the invention with unnecessary details.

General Overview of a Data Transfer Mode Selection System

FIG. 1 illustrates a block diagram of a system 10 for selectably enabling multiple-channel (multi-channel) data transfer operation and access modes in accordance with the present invention. The system 10 comprises at least one source device 12, at least one destination device 14, and a data transfer mode selection system 16. In general, system 16 controls the nature and type of data transfer amongst the source devices 12 and destination devices 14. As will be described subsequently in further detail, system 16 is enabled to deterministically control data transfer mode (e.g., operation and access) between the source and destination devices 12, 14, based on corresponding configuration information.

Figure 2:
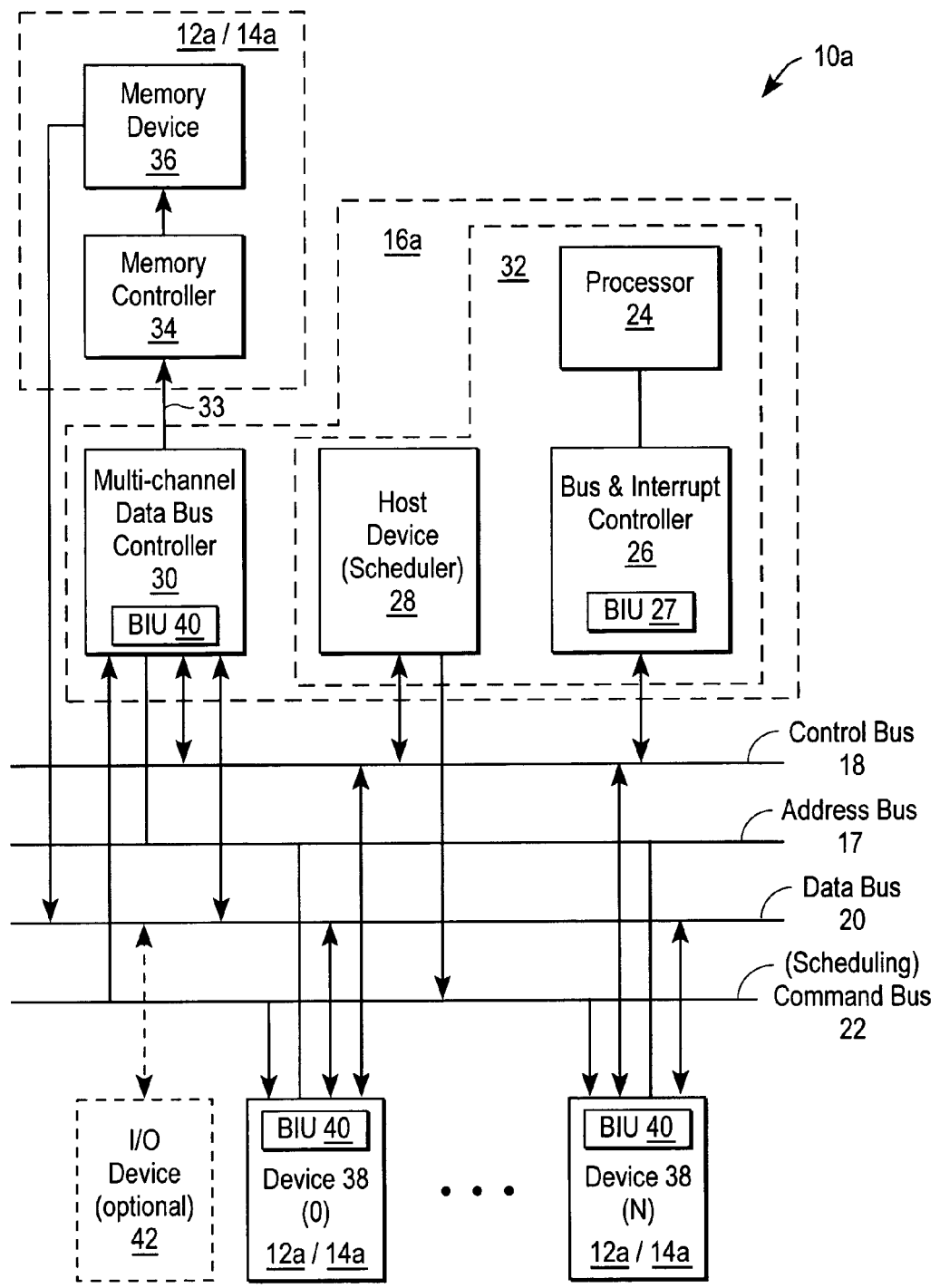
FIG. 2 is a block diagram of one embodiment of the data transfer selection mode system of FIG. 1.

FIG. 2 illustrates one embodiment of a system for selectably enabling multi-channel data transfer modes amongst devices and a storage element. System 10a includes various embodiments of source and destination devices, some of which are shown in dashed and solid lines. These devices are and labeled as "12a/14a" to indicate that they may function as either a source device 12a or a destination device 14a, depending on the nature of the data transfer involved. As shown, system 10a also includes an embodiment of a data transfer mode selection system 16a.

The data transfer mode selection system 16a includes a processor 24, a bus and interrupt controller 26, host device (scheduler) 28, and a multiple channel (multi-channel) data bus controller 30. One embodiment of a source device 12a or a destination device 14a includes a memory controller 34 and memory device 36. Signal line 33 generally couples memory controller 34 to multi-channel data bus controller 30, an will be described in more detail subsequently. Other embodiments of a source device 12a and destination device 14a are generally referred to as devices 38. Devices 38 designate a plurality of devices ranging from 0 to N, where N is an integer. The multi-channel data bus controller 30 and each of the devices 38 include a device buffer interface unit (BIU) 40, which will be described in more detail subsequently. The bus and interrupt controller 26 includes a host BIU 27, which also will be described in more detail subsequently.

Collectively, source devices 12a, destination devices 14a and data transfer mode selection system 16a are communicatively coupled together via an address bus 17, a control bus 18, data bus 20 and (scheduling) command bus 22. By way of example, data bus 20 can be 32-bits wide with 23-bit address space used in association with a READ request, a WRITE request, a last transfer signal and a transfer acknowledge signal. Buses 18 and 22 each comprises a 16-bit control or command bus used in association with a READ request, a WRITE request, a last transfer request, and request acknowledge, interrupt, and interrupt acknowledge signals. Where predetermined amounts of data are expected to be transferred between the source devices 12a and destination devices 14a, the command bus 22 can include a 12-bit scheduling counter to monitor on-the-fly the amount of data that has been transferred.

Optionally, an input/output (I/O) device 42 may be coupled to the data bus 20.

Figure 3:
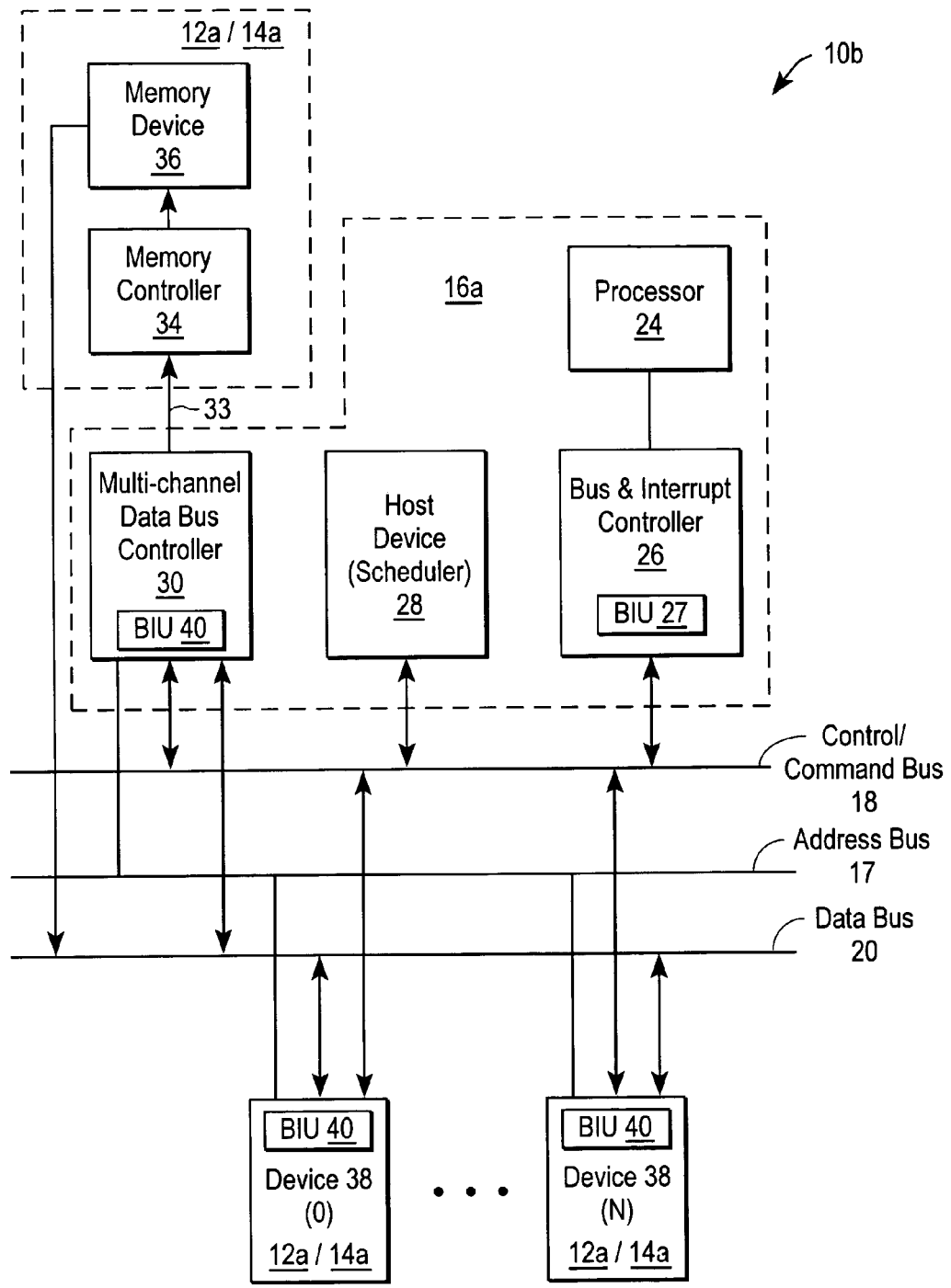
FIG. 3 is a block diagram of another embodiment of the data transfer selection mode system of FIG. 1.

It will be understood that the present invention will work suitably well with other bus arrangements, and is not limited by the particular implementation described. For example, in an alternate embodiment in accordance with the present invention, the control bus 18 can be modified to include the functions of the scheduling command bus 22. Referring to FIG. 3, a particular implementation of this alternate embodiment is shown and includes a system 10b for selectably enabling multi-channel data transfer operation modes, and a control/command bus 19, which has replaced buses 18 and 22 of FIG. 2. This alternate embodiment avoids the additional routing associated with a separate command bus 22, which is advantageous for System on Chip (SoC) and Application Specific Integrated Circuits (ASIC) applications where integrated circuits increasingly require compact and stream-lined designs. It will become apparent to those skilled in the art that with such alternate embodiments and other implementations, appropriate modification to the timing and control process described herein should be made. In the description to follow, reference to the embodiment of FIG. 2 will be made primarily: to avoid obscuring the invention with additional details; and with the understanding that the general techniques described can be applied to various embodiments and implementations of the system 10 for selectably enabling the multi-channel data transfer modes.

Processor 24 is a central processing unit (CPU) or microprocessor. In general, processor 24 may be any suitable microprocessor with on-chip memory for encoding sub-sampled video signals, such as an Intel i860 pixel processor, programmed to implement the video processing techniques in accordance with the present invention. When system 10a is used with Very Large Scale Integration (VLSI), ASIC, and SoC applications, it is preferable to use components that keep the manufacturing costs of system 10a low. According to one implementation that helps to keep manufacturing costs low, processor 24 is selected to be a RISC-based CPU capable of facilitating the transfer of blocks of data, and of handling interrupts which may be initiated by the hardware or software. Other general parameters associated with providing a low cost processor 24 include having a 16-bit arithmetic logic unit (ALU), an 18-bit instruction set, and an operating speed up to 100 MHz. Processor 24 is communicatively coupled to the bus and interrupt controller 26. It is noted that the present invention is not limited to working with processors having low manufacturing costs or with the parameters described here, but will work suitably well with a variety of other processors.

Figure 24:
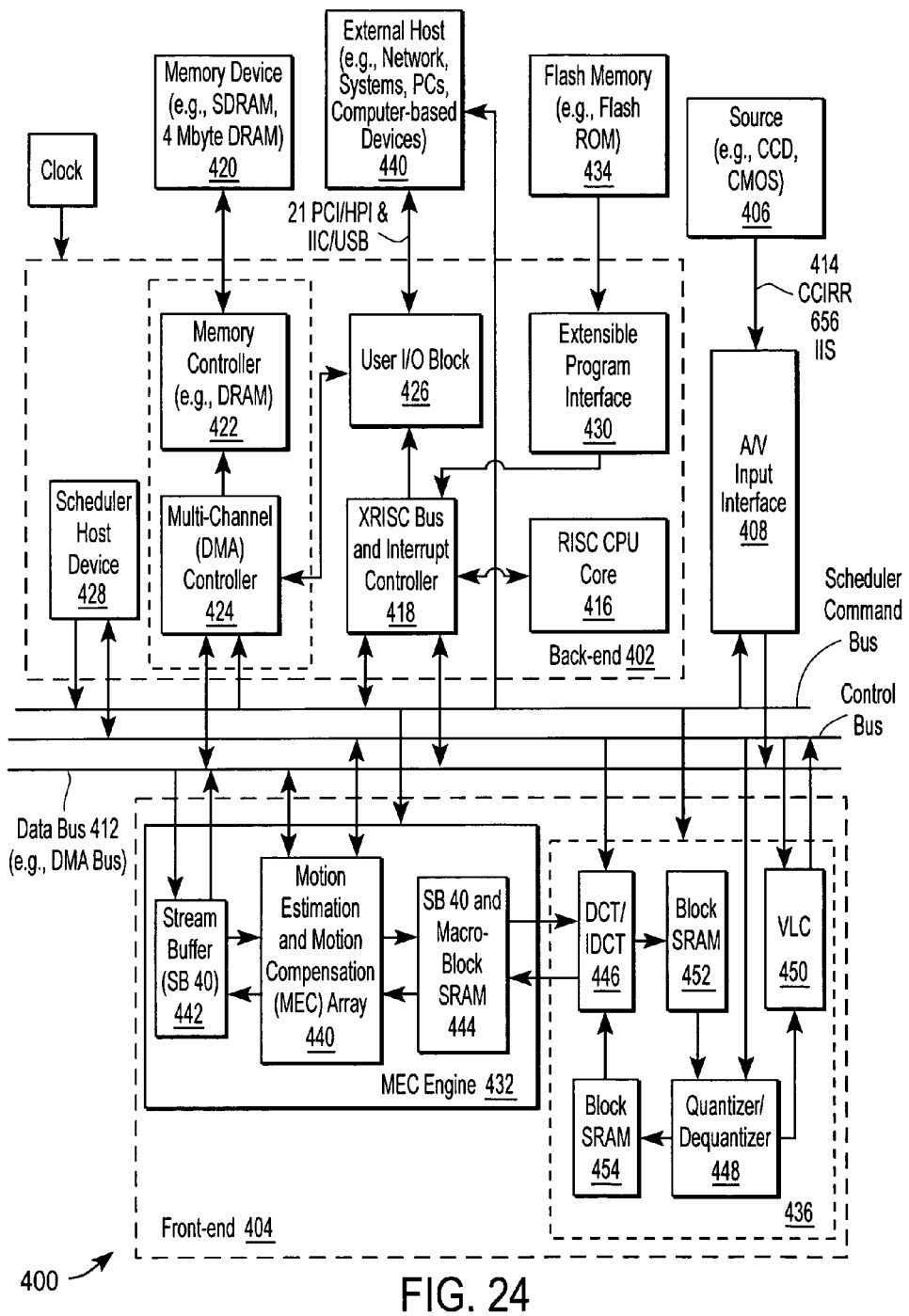
FIG. 24 is detailed block diagram of one embodiment of a video processing system well-suited for use with the data transfer selection mode system of FIG. 1.

The bus and interrupt controller 26 (referred to as "controller 26" for convenience) is the internal controller of system 10a. Controller 26 is responsible for generating internal interrupts, and for handling such interrupts. By way of example, such interrupts may be hardware and software interrupts, in addition to the externally generated interrupts described. In general, controller 26 will interpret commands, and although not shown explicitly, will perform interrupt handling, which may involve configuring registers, setting associated result registers and an acknowledge register, if necessary. Where the source of the interruption is caused externally to system 10a, bus and interrupt controller 26 accepts such interruption through I/O device 42, provides the interrupt handling as described, and then generates an external interruption to acknowledge the initial interrupt command. For example, controller 26 can generate an external interruption in the Host Parallel Interface (HPI), or an interruption package associated with a Universal Serial Bus (USB) port, both of which are suitable techniques used by I/O device 42. In one embodiment in accordance with the present invention, bus and interrupt controller 26 is an XRISC bus and interrupt controller handling the workflow of the data and control signals for the computing tasks of processor 24. One embodiment of system 10 that includes an XRISC bus and interrupt controller will be subsequently described with reference to FIG. 24, illustrating a video processing system 400 that is well-suited for use with the system for selectably enabling multi-channel data transfer operation and access modes in accordance with the present invention.

The host device (scheduler) 28 is generally a timing mechanism for scheduling and enabling activation of the devices in system 10a. An exemplary scheduler 28 for enabling the scheduling and synchronization of operations and data transfers intended to be performed by particular devices 12a, 14a at specific predetermined times in an operational cycle is disclosed in commonly-assigned copending U.S. patent application Ser. No. 10/033,857, filed Nov. 2, 2001, entitled "Video Processing Control and Scheduling", the subject matter of which is herein incorporated by reference it its entirety.

Having generally described the system 10a for selectably enabling multi-channel data transfer operation and access modes, further details of the multi-channel data bus controller 30 will now be discussed. As will be described subsequently in more detail, multi-channel data bus controller 30 enables data transfer amongst devices 38 and amongst a memory element 36 and devices 38. Controller 30a is capable of being configured to enable a plurality of data transfer operation and access modes. Thereafter, several exemplary data transfer operation modes will be described, including a sequential mode and a multi-segment mode, as well as other data transfer operation modes.

An Implementation of a Multiple Channel Data Bus Controller

The controller 30 controls the transfer of data between one device 38 to another or between a device 38 to memory device 36 (e.g., an external SDRAM). The memory device 36 includes its own format of configuration parameters for data transfer, which is different from the transfer behavior of the devices 38 for the video processing system (which generally uses continuous data burst transfer). The controller 30 complies with this type of data transfer format and interfaces with the memory device 36.

Figure 4:
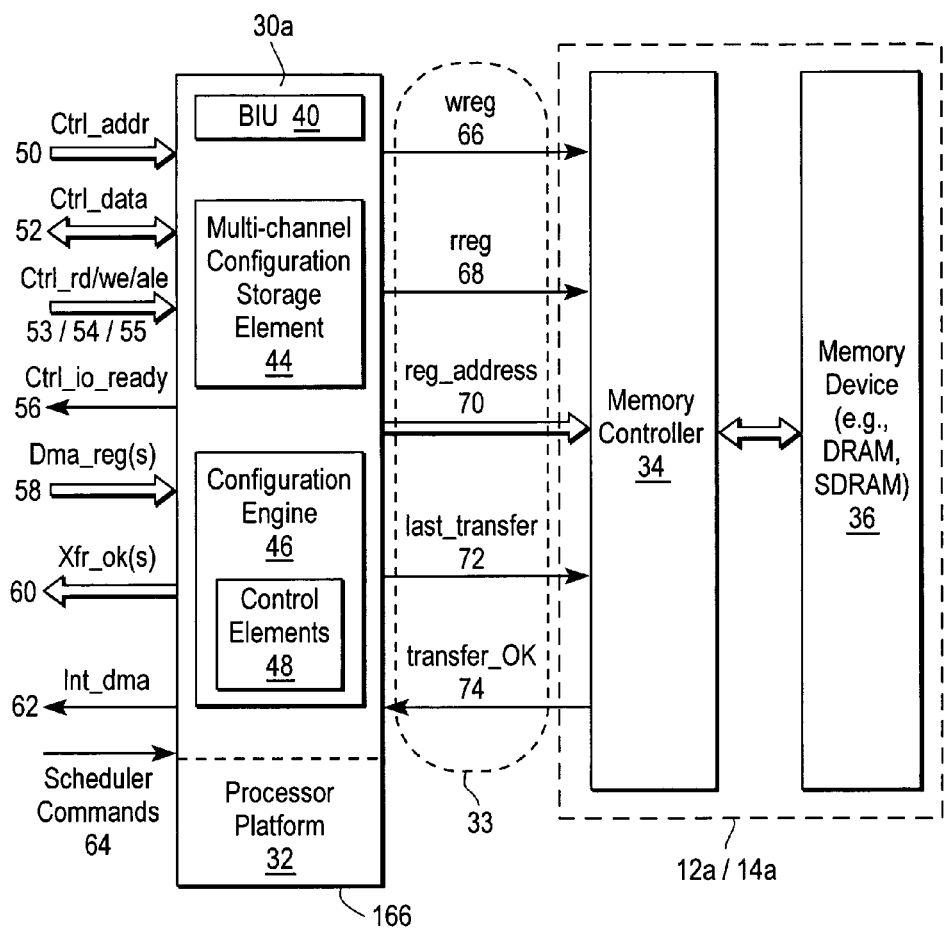
FIG. 4 is a block diagram of one embodiment of a multi-channel data bus controller in accordance with one aspect of the present invention.

Reference is now made to FIG. 4, which illustrates one embodiment of the data transfer mode selection system 16b, having a multi-channel data bus controller 30a, and processor platform 32. Processor platform 32 represents the processor 24, bus and interrupt controller 26 and scheduler 28 previously described. Multi-channel data bus controller 30a includes a "device" bus interface unit (BIU) 40, a multi-channel configuration storage element 44, and a configuration engine 46 having associated control elements 48. The distinction between a "device" and "host" bus interface units will be subsequently described in detail.

Multi-channel data bus controller 30a ("controller 30a") is enabled to receive address information (ctrl_addr) 50 from the control bus 18, and is capable of sending data and receiving data (ctrl_data) 52 respectively to and from the data bus 20. Additionally, controller 30a is communicatively coupled to the control bus 18 to receive data enable signals 53, 54, 55 (e.g., read 53, write enable 54, Address Latch Enable (ALE) 55, referred to as ctrl_rd/we/ale for convenience), an input output ready (ctrl_io_ready) signal 56, direct memory access request (Dma_req(s)) signals 58, transfer ok (transfer_ok) 60 signals, and an interrupt direct memory access (int_dma) signal 62. Controller 30a receives scheduler command signals 64 broadcasted from the scheduler 28 over command bus 22, as described in more detail in U.S. application Ser. No. 10/033,857, filed Nov. 2, 2001, the subject matter of which is incorporated by reference herein.

Controller 30a communicates with memory controller 34 over signal line 33 shown generally in FIGS. 2–3, and in more detail in FIG. 4. As seen in FIG. 4, signal line 33 comprises WRITE request signals 66, READ request signals 68, request address signals 70, last_transfer signals 72, and transfer_ok signals 74. In general, controller 30a forwards WRITE request (wreq) signals 66 and READ request (rreq) signals 68 that are received by the controller 30a and generally indicated as Dma_req(s) 58. Additionally, controller 30a provides a request address (req_address) 70 to memory controller 34. Last transfer (last_transfer) signals 72 generated by the source and destination devices 12a/14a are received by the controller 30a and communicated to the memory controller 34 in those instances where the memory device 36 is involved in the data transfer. When the memory device 36 is involved in the data transfer, the controller 30a receives a transfer_ok signal 74 from the memory controller 34 indicating that the data transfer was successful.

1. Multi-Configuration Operation and Access Modes

There are different configurations stored in the configuration storage element 44, and each configuration may be associated with a different data transfer operation and/or access mode that is selected by the controller 30a. Several exemplary configurations representing the types of configuration data stored in the configuration storage element 44 are now described. According to one embodiment described in FIG. 5 subsequently, the configuration storage element 44 is implemented with a configuration register file 44a having the following operation modes, namely fixed-length single burst mode, multi-segment mode, sequential mode with auto-rollback, chaining mode, and virtual channel mode, by way of example. Other data transfer operation modes that can be enabled are described subsequently in more detail.

A configuration specifies a set of data bus parameters for data transfer, like Direct Memory Access (DMA) data transfer. Such parameters include the data source, data destination, transfer mode, base address, base count and multi-segment options. In one described embodiment where the configuration storage element 44a comprises 32 configurations, when a specific transfer is to be executed, the host device (scheduler) 28 switches the corresponding configuration to be loaded into the controller 30a. Each configuration can be selected from a combination of access mode (e.g., READ or WRITE) and operation mode (e.g., sequential, multi-segment, auto-rollback, chaining, fixed length burst, virtual channel), typically with parameters that include starting address, and length of data transfer.

Sharing of the same data path to the memory device 36 makes the configurations time-individual. This means that the corresponding data transfer takes individual control of the data bus 20, and therefore, the memory access through the configurations is made serially. The configurations are designed for different devices 38 that have regular and periodic memory access. One manner of maintaining a seamless data transfer operation, and of minimizing the overhead of the configuration register file 44a is to assign each configuration to a specific operation. In general, the configuration register file 44a can be programmed at an initialization stage by the bus and interrupt controller 26. Updates can be made to the configuration register file 44a automatically by the controller 30a, or by the bus and interrupt controller 26 when necessary. As will be described subsequently in one implementation, two registers can be used to enable the bus and interrupt controller 26 to read and update the configuration register file 44a.

2. Configuration Storage Element

Figure 5:
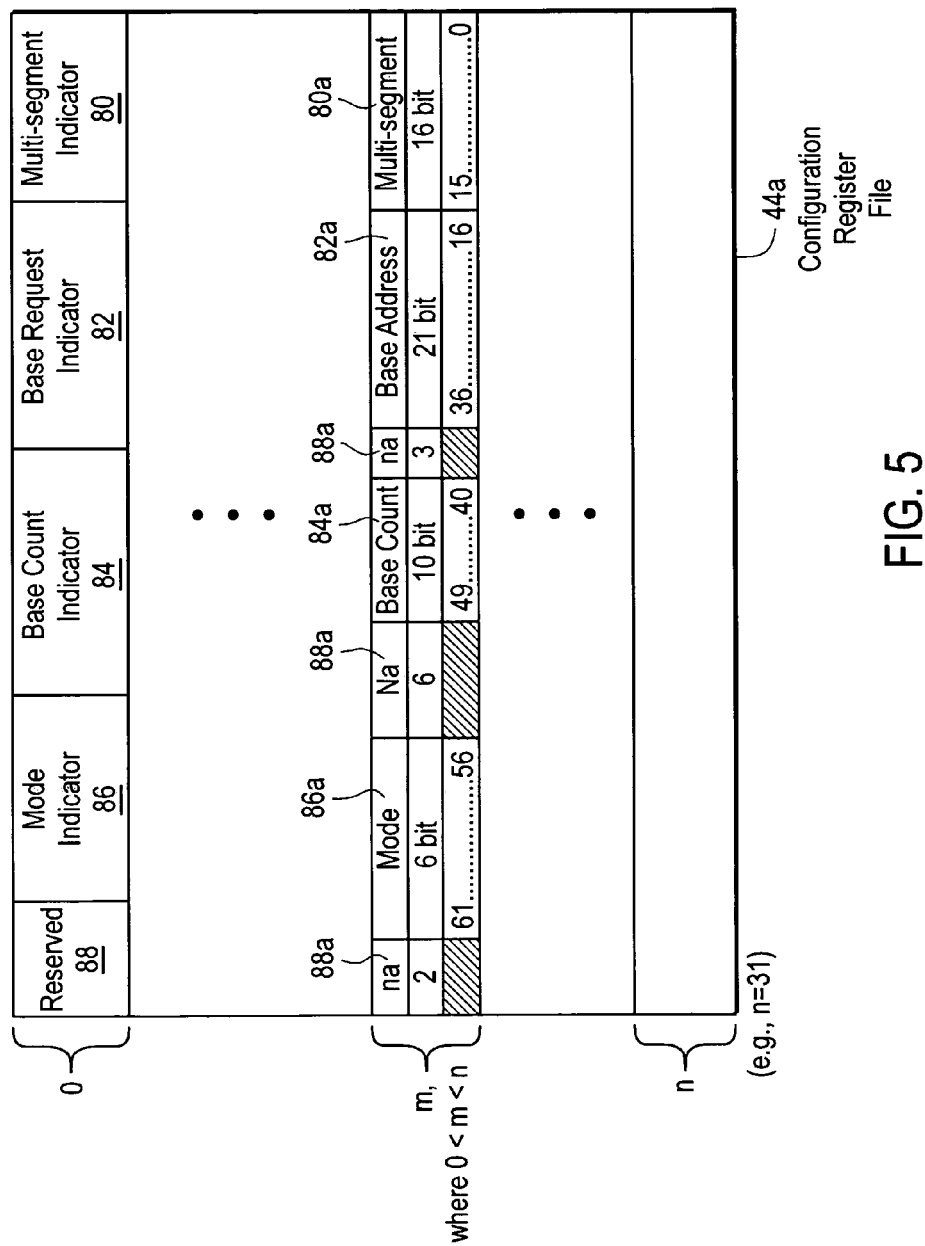
FIG. 5 is a block diagram of one embodiment of the configuration storage element of the multi-channel data bus controller of FIG. 4.

Referring to FIG. 5, one particular implementation of configuration storage element 44 is shown in the nature of a configuration register file 44a. In general, configuration register file 44a includes a multi-segment indicator 80, a base request indicator 82, base word count indicator 84, operation mode indicator 86 and optional reserved section(s) 88. The configuration register file 44a is designed to store configuration data represented as 0 to n entries, where n is an integer. By way of this example, configuration register file 44a can include 32 configuration entries, each being 64-bits wide and representing a channel of the multiple-channels in the multi-channel data bus controller 30a. The configuration register file 44a facilitates one aspect in accordance with the present invention to selectably enable a plurality of data transfer modes along multiple channels.

Also by way of example, the register bitmap for each entry, m, where 0<m<n, of the configuration register file 44a can include the following fields. Multi-segment indicator 80 can be represented as a multi-segment register 80a having 16-bits (e.g., bits 15:0). Base request indicator 82 can be represented as a base request address register 82a having 21-bits (e.g., bits 36:16). Base word count indicator 84 can be represented as a base word count register 84a having 10-bits (e.g., bits 49:40), and operation mode indicator 86 can be represented as an operation mode register 86a having 6-bits (e.g., bits 61:56). The optional reserved section(s) 88 may be represented by other bits 88a (e.g., bits 63:62, 55:50, and 39:37) that are unused, and in particular, may be "don't cares" or may be reserved bit gaps implemented to allocate the registers to 4-bit boundaries.

Reference is now made to Table 1, which includes an exemplary bitmap of those 16-bits (e.g., bits C15:C0) of the multi-segment register 80a representing multiple segment data transfers. The higher 4-bits (e.g., bits C15:C12) are used as a segment count (Cnt3:Cnt0), and the lower 12 bits (e.g., bits C11:C0) are used to represent segment spacing (S11:S0). As will be subsequently described, in a data transfer during a sequential operation mode with auto-rollback (i.e., an operation mode that will be described subsequently), the high 4-bits are reset to zeros, so that Cnt0 through Cnt3 are zeros; and the upper boundary and lower boundary addresses (to be described subsequently) are stored in bits C10:C6 (as indicated by U4:U0), and bits C5:C0 (as indicated by L4:L0), respectively. Unused bits can be represented by "don't cares (dc)".

TABLE 1

Exemplary Register Bitmap of Multi-Segment Indicator

| C15 | C14 | C13 | C12 | C11 | C10 | C9 | C8 | C7 | C6 | C5 | C4 | C3 | C2 | C1 | C0 |
|---|---|---|---|---|---|---|---|---|---|---|---|---|---|---|---|
| Cnt3 | Cnt2 | Cnt1 | Cnt0 | S11 | S10 | S9 | S8 | S7 | S6 | S5 | S4 | S3 | S2 | S1 | S0 |
| dc | dc | dc | U4 | U3 | U2 | U1 | U0 | dc | dc | dc | L4 | L3 | L2 | L1 | L0 |

The segment count, Cnt3:Cnt0, represents the number of segments that need to be transferred at a time. The segment spacing, S11:S0, represents the offset of the starting addresses between two segments. This offset may be selected from a maximum of $2^{12}=4096$ values. In the multi-segment operation mode, preferably the contents of the multi-segment register do not expire. The upper boundary address, U4:U0, represents that upper boundary address (e.g., upper limit 98 in FIG. 6c) used with the auto-rollback feature in accordance with one aspect of the present invention. Similarly, the lower boundary address 96, L4:L0, represents that lower address (e.g., upper limit 98 in FIG. 6c) used with the auto-rollback feature. Both the upper boundary address 98 and the lower boundary address 96 are derived from the upper 5-bits of the 21-bit physical address (i.e., stored in the base request address register 82a) of the memory device 36. In a particular implementation, the upper and lower boundaries can be aligned with 64-bits by merely extending the remaining 16-bits of the 21-bit address padded with don't cares.

According to one embodiment, the auto-rollback mode is not initiated with the multi-segment mode. This enables the bits of the multi-segment register 80a to be shared amongst sequential and multi-segment data transfer operation modes, thereby reducing the need for additional memory storage elements.

Reference is made to Table 2, which includes an exemplary bitmap of those bits (e.g., 21 bits, C36:C16) of the base request address register 82a representing the base address of a data transfer. The base request address represents the linear (i.e., physical) address of the memory device 36. Base request address register 82a is preferably programmed during an initialization stage of system 10a. Additionally, base request address register 82a can be reprogrammed by the bus and interrupt controller 26 and by controller 30a when necessary.

In Table 2, bits C36:C16 of the base address request register 82a represents the starting address of data transfer. In the sequential data transfer operation mode, this register remains unchanged after a transfer when an address is reset, like for e.g., if the addr_rst bit (C57 in Table 4, described subsequently) is set to 1. Otherwise, the base address request register 82a will be refreshed with the ending address incremented by one so that the subsequent data transfer may continue on the same buffer. This technique will be subsequently referred to as chaining mode and is advantageous because less user intervention is required. During the multi-segment operation mode, the base request address register 82a preferably remains unchanged after the completion of a data transfer.

Reference is now made to Table 3, which includes an exemplary bitmap of those bits (e.g., 10-bits C49:C40) of the base word count register 84a representing: the length (e.g., total number) of data words to be transferred in sequential mode; and the length of a segment to be transferred in multi-segment mode. By way of example, a 10-bit register representing the base word count can represent $2^{10}=1024$ values. Preferably, the base word count register 84a should be loaded with the base word count (Cnt9:Cnt0) prior to the first transfer being undertaken so as to take effect during the first transfer. Similarly, a new value can be written to register 84a at any time, but should preferably take effect in an upcoming data transfer. Also, the base word count preferably never expires. This is beneficial since a user need not reprogram the register 84a if a subsequent transfer has the same length.

TABLE 3

Exemplary Register Bitmap of Base Count Indicator

| C49 | C48 | C47 | C46 | C45 | C44 | C43 | C42 | C41 | C40 |
|---|---|---|---|---|---|---|---|---|---|
| Cnt9 | Cnt8 | Cnt7 | Cnt6 | Cnt5 | Cnt4 | Cnt3 | Cnt2 | Cnt1 | Cnt0 |

Reference is now made to Table 4, which includes an exemplary bitmap of those 6-bits (e.g., bits C61:C56) of the mode register 86a representing the operation mode of the data transfer, by way of example.

TABLE 2

Exemplary Register Bitmap of Base Request Indicator

| C36 | C35 | C34 | C33 | C32 | C31 | C30 | C29 | C28 | C27 | C26 | C25 | C24 | C23 | C22 | C21 | C20 | C19 | C18 | C17 | C16 |
|---|---|---|---|---|---|---|---|---|---|---|---|---|---|---|---|---|---|---|---|---|
| A20 | A19 | A18 | A17 | A16 | A15 | A14 | A13 | A12 | A11 | A10 | A9 | A8 | A7 | A6 | A5 | A4 | A3 | A2 | A1 | A0 |

TABLE 4

Exemplary Register Bitmap of Mode Indicator

| C61 | C60 | C59 | C58 | C57 | C56 |
|---|---|---|---|---|---|
| CMsk | Imsk | Vrt_ch | Rollback | Addr_rst | Wrj |

In Table 4, bit C61 represents a configuration mask (CMsk), which when set, disables the corresponding configuration. When the CMsk bit is disabled, the controller 30a does not start a data transfer even if configuration data is loaded, the appropriate hardware requests are enabled, and the appropriate software commands are received by the controller 30a. In one embodiment, controller 30a is capable of generating an interrupt request (int_dma) signal 62 when a data transfer is completed. Bit C60 represents an interrupt mask (IMsk), which when set, will prevent the interrupt signal associated with the corresponding configuration at the end of a transfer. Preferably, controller Bit C59 represents a virtual channel mode is active or not. For example, when the Vrt_ch bit is set to 1, a transfer between a (source) device 0 and a (destination) device N−1 can be enabled. Otherwise, when the Vrt_ch bit is set to 0, the memory device 36 is either the source or destination device of the data transfer.

Still referring to Table 4, a rollback bit C58 can be implemented to facilitate the auto-rollback mode used with a sequential data transfer mode. The auto-rollback mode will be described subsequently with respect to FIG. 6C.

The address reset (addr_rst) bit C57 can be used with the sequential transfer mode. If this bit is set to 0 when a transfer is started, the base request address register 82a should be set to the end address incremented by 1 after the transfer so that the chaining mode is undertaken. Otherwise, the base request address register 82a remains unchanged so that the base address is not reset after a present data transfer is completed.

The Wrj bit C56 indicates the type of data transfer operation. For example, when the upcoming data transfer is a WRITE access mode, (i.e., data transfer from devices 38, 40 to the memory device 36), the Wrj bit is set to 1. When the upcoming data transfer is a READ access mode, the Wrj bit is set to zero. The configuration data stored in the configuration register file 44a is preferably programmable, as opposed to being fixed, and may be updated and loaded via an external device (e.g., 1410 of FIG. 24) using firmware upon initialization of system 10a.

A. Sequential Operation Mode

In the sequential mode, consecutive blocks of data (i.e., contiguous) are transferred. The base word count register 84a and the base request address register 82a are preferably loaded with starting address information upon initialization of system 10a. The value stored in the base word count register 84a should remain the same after a data transfer is completed. Also, the base request address can remain unchanged after a data transfer. This type of data transfer operation mode is referred to as a fixed length mode, which is one type of a sequential operation mode.

Figure 6A:
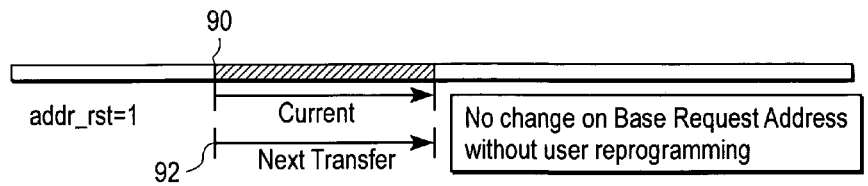
FIG. 6A is an illustration of address memory for sequential data transfer operation mode.

Referring to FIG. 6A, one manner of selectably enabling multi-channel data transfer using a fixed length mode is shown, wherein the starting address 92 of a subsequent data transfer is reset to the original address 90 so that the subsequent transfer will begin from the same address as the present transfer. To implement this operation mode, the addr_rst bit C57 in the operation mode register 86a is set to 1. Accordingly, both present and subsequent data transfers involve transferring the same block of memory. This method is beneficial where user programming is unavailable, so that the next transfer begins at the same address and lasts for a same length if the base request address register 82a is selected to retain its existing value.

Figure 6B:
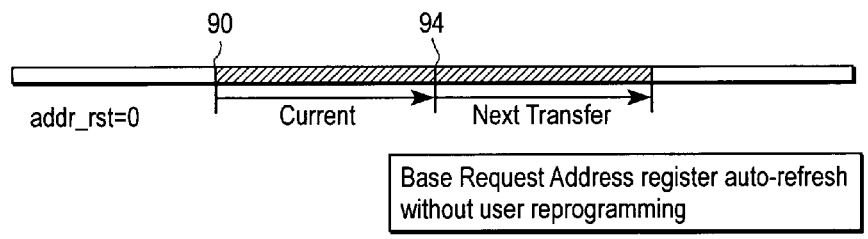
FIG. 6B is an illustration of address memory for a chaining data transfer operation mode.

Alternatively, the base request address can be selected to be the address in which the subsequent data transfer ends incremented by one, so as to prepare for a subsequent (e.g., next) data transfer. To implement this type of sequential data transfer operation mode referred to as chaining mode, reference is made to FIG. 6B to illustrate that when an address reset (addr_rst) is not invoked, the next data transfer initiates after the ending address 94 of the present data transfer.

Accordingly, this technique is referred to as a "chaining" transfer because each subsequent data transfer is initiated from the end of a present data transfer, thereby forming a chain of data transfers. The next transfer follows the present transfer and lasts for the same length. This method is advantageous because the base request address register 82a is automatically refreshed without requiring user reprogramming.

Whether fixed length mode or chaining mode is selected from the configuration register file 44a, the next transfer then uses one of the corresponding base request addresses described. By doing so, the information in the two registers 84a, 82a for the base word count and the base request address, respectively, will not expire.

Figure 6C:
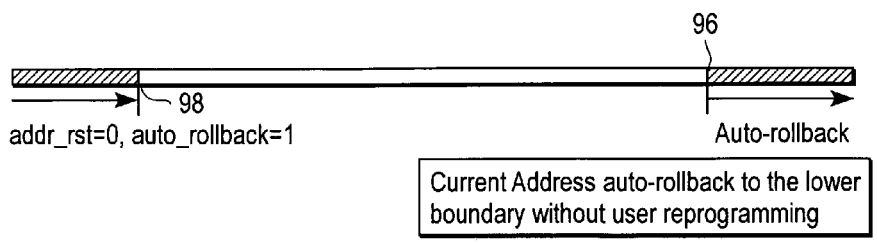
FIG. 6C is an illustration of address memory for auto-rollback data transfer operation mode.

Reference is now made to FIG. 6C to describe the auto-rollback mode, which is a type of sequential operation mode. With the auto-rollback mode, two addresses 96, 98 can be programmed in the configuration register file 44a as upper and lower boundaries, respectively, of the address for the memory device 36. When the next address is selected to be transferred reaches the upper boundary address 98, a current address indicator automatically rolls back to the lower boundary address 96, preferably without user reprogramming. The auto-rollback mode may be implemented by setting the rollback bit C58. The auto-rollback mode is preferably enabled automatically by controller 30 without intervention of the bus and interrupt controller 26.

The auto-rollback mode is advantageous for preventing the processor 24 from being burdened with processing functions. Consequently, this enables the processor 24 to lend its attention to other more important tasks. Because the processor 24 is not directly involved in the data transfer, a processor 24 with a slower speed may be selected and will not necessarily impede the speed of the data transfer operations. Selecting a processor 24 with a slower speed is often useful for those applications that require low manufacturing costs of the corresponding application. Referring to FIG. 24 for example, with a DMA controller 424 representing the data bus controller 30a, the DMA controller 424 receives compressed video data output from the VLC 450 and having a random pattern. The length and time of each transfer may be unknown. The configuration register file 44a includes a specific configuration set for the VLC 450 to WRITE data to a buffer (e.g., a first-in-first-out FIFO buffer not explicitly shown) in controller 424. As the buffer fills up, if the auto-rollback mode is active, controller 424 would enable new data received at the end of the FIFO buffer to be loaded from the front of the FIFO buffer. This reduces the intervention of the XRISC bus and interrupt controller 418 and RISC processor 416. The auto-rollback mode is advantageous because it does not require that the processor 416 check the output of the VLC 450 in order to ascertain whether the upper limit of the buffer has been exceeded. Additionally, because the frequency of data transfer from the VLC 450 to the SDRAM 420 may be random, without the auto-rollback mode, additional computing (i.e., processing) power will need to be devoted to the data transfer task.

B. Multi-Segment Operation Mode

With the multi-segment mode, a specific amount of non-contiguous blocks of data (i.e., segments) are transferred amongst devices 38, and amongst devices 38 and the memory device 36. In one embodiment in accordance with the present invention, the multi-channel data bus controller 30a is a multi-channel DMA controller (e.g., 424 of FIG. 24) having a multi-segment data transfer operation mode. Multi-segment data transfers comprise several segments of burst transfers typically of fixed length and aligned in segment spacing, that is, with the ending address of one segment adjacent to the starting address of the next segment.

Figure 7:
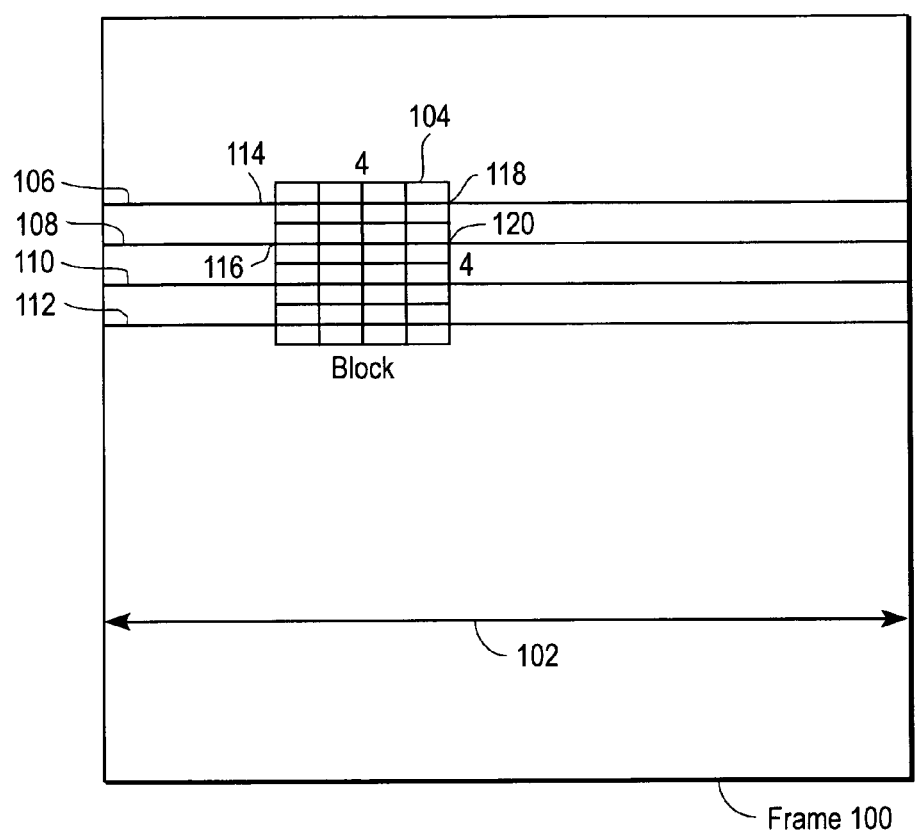
FIG. 7 is block diagram of an exemplary data block of interest within a video frame that can be used with the multi-segment data transfer operation mode.

Referring to FIG. 7, a frame 100 having multiple lines 102 of pixel data is illustrated. The multi-segment mode of data transfer is advantageous for transferring a block 104 of a frame 102. To this end, the multi-segment mode is well-suited for blocks of data transferred according to the MPEG standard. When encoding video frames, typically only several segments of data are of interest, for example, like those representing block 104. As block 104 is represented in a sequence of frames, the length of the segment and the spacing of the segment representing block 104 is typically fixed. One advantage of using the multi-segment mode is that a set of parameters may be specified at one time so that data may be automatically transferred, thereby resulting in cost savings in data transfer and processing time and with less intervention by the bus and interrupt controller 26.

Figure 8:
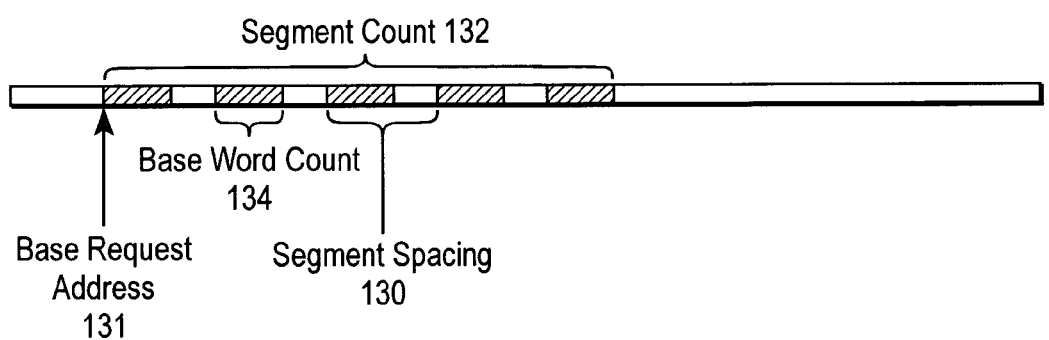
FIG. 8 is an illustration of address memory for a multi-segment data transfer operation mode.

Referring to FIG. 8, an illustration of a buffer layout for the multi-segment data transfer operation mode is shown. In comparison with the sequential mode, for a multi-segment mode, two additional parameters are used, namely segment spacing 130 (S11:S0 in Table 1) and segment count (Cnt3: Cnt0 in Table 1), as described with respect to multi-segment register 80a. A multi-segment transfer begins at a base request address 131, that is the beginning address of the transfer. The segment spacing 130 generally represents the length of a line 102, as indicated in FIG. 7. For example, the length of the line may be: from the beginning address 114 of the block 104 on line 106 to the beginning address 116 of the block 104 on line 108; or from the ending address 118 of the block 104 of line 106 to the ending address 120 of the block 104 on line 108. The segment count 132 represents the number of lines to be transferred, for example 4 lines for the block 104 of FIG. 7. The base address preferably remains unchanged regardless of the addr_rst bit setting. The base word count 134 represents that part of the line being of interest, for example, from addresses 114 to 116 on line 106. In FIG. 7, the base word count represents the width of block 104 as demarcated by addresses 114 and 118. The base word count 134 can be implemented with the base word count register 84a, previously described with reference to Table 3.

Following a first segment, data transfer continues at an address determined by the base request address 131 plus each segment spacing 130. Data transfer ends after all of the segments have been transferred. One aspect in accordance with the present invention is that the multi-segment mode does not require the specific starting and ending addresses for the data transfer, and the length of the transfer to be programmed as with conventional DMA controllers. Rather, a current word count register (e.g., 282, 284 described in FIG. 11) can be used to indicate the amount of total data to be transferred. Because only selected blocks of data that are of interest are transferred, one advantage of the multi-segment mode is that it avoids the need to transfer the entire set of data as with conventional data transfer techniques.

Without the multi-segment mode, conventional DMA controllers require reprogramming for four times the transfer of block 104, which typically entail setting 4 different configurations to transfer block 104. Referring back to FIG. 7 for example, if a 4×4 block of pixels is of interest during data transfer, using conventional DMA data transfer methods, parameters are ascertained as many times as the desired number of lines to transfer. This requires transmitting the entire 4 lines 106–112 of the frame 102. By not having to reprogram the controller 30a for each line 102 when using the multi-segment mode when transferring data block 104, an overall improvement in the speed of operation during the data transfer process can be realized.

C. Virtual Channel Operation Mode

In general, the virtual channel operation mode entails data transfers amongst devices 38. A device (e.g., 0) to device (e.g., n–1) data transfer operation typically does not involve having controller 30a access the memory device 36.

Figure 9:
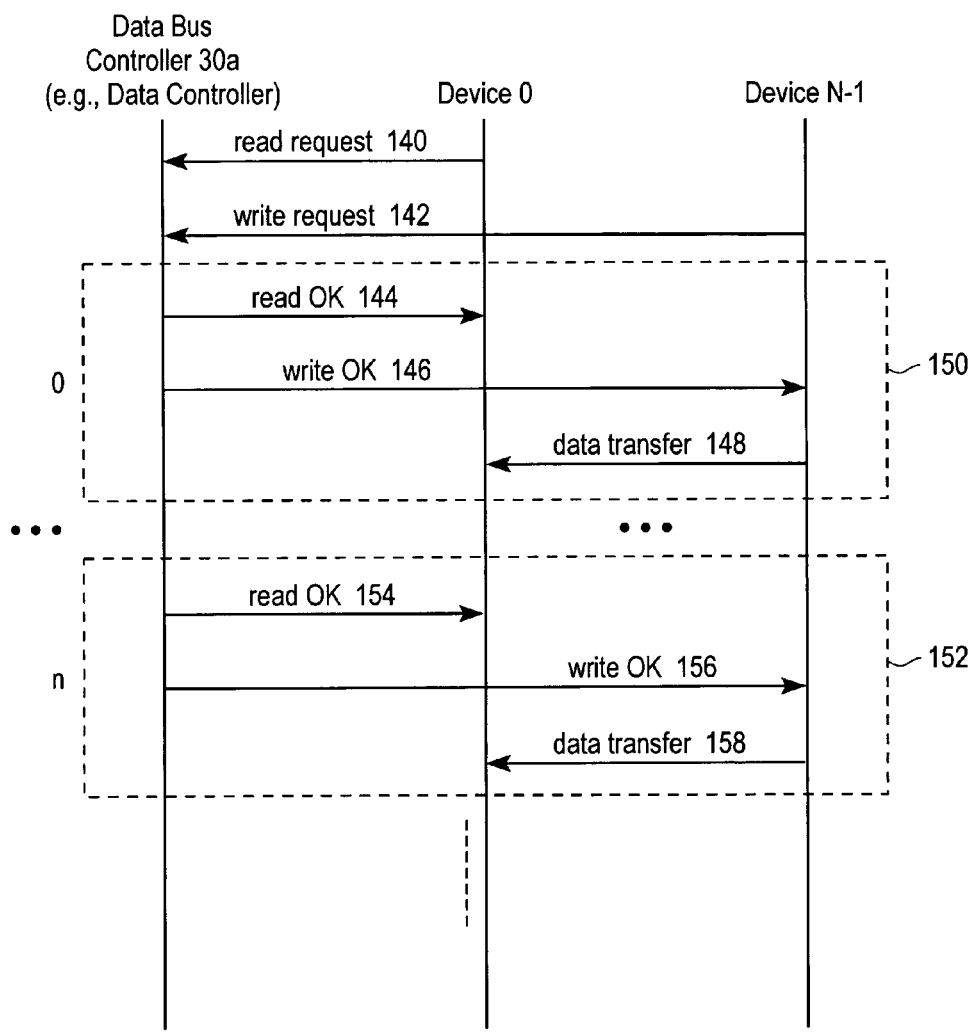
FIG. 9 is communication flow diagram for the multi-channel data bus controller and various devices for a virtual channel data transfer operation mode.

Referring to FIG. 9, a signal flow diagram illustrates the communication between devices 38a and controller 30a. As shown in FIG. 9, the device 0 transfers data to device n–1 according to the following method. To initiate the virtual data transfer, device 0 transmits 140 a READ request to controller 30a, and device N–1 transmits 142 a WRITE request to controller 30a. In general, these requests 140, 142 indicate to the controller 30a that a data transfer is being requested between devices and does not involve access or communication with the memory device 36. In response, controller 30a will access the particular entry in the configuration register file 44a to determine a corresponding configuration for the device-to-device transfer being requested. The controller 30 sends 144, 146 an acknowledgment, READ_OK to device 0 and WRITE_OK to device N–1, respectively. In response, the two devices 0 and N–1 may then communicate 148 data with each other. The process entailing 144, 146 and 148, collectively referenced as 150 may include the data transfer for one unit of data, whether it be a word, segment, or block. Subsequently and as generally indicated by 152, more data can be read from device 0 and written to device N–1. For example, a source device can send 152 one clock of READ_OK, and a destination device can send 156 one clock of WRITE_OK to the controller 30a, and thereafter begin transferring 156 data.

2. Configuration Engine and Associated Control Elements

Figure 10:
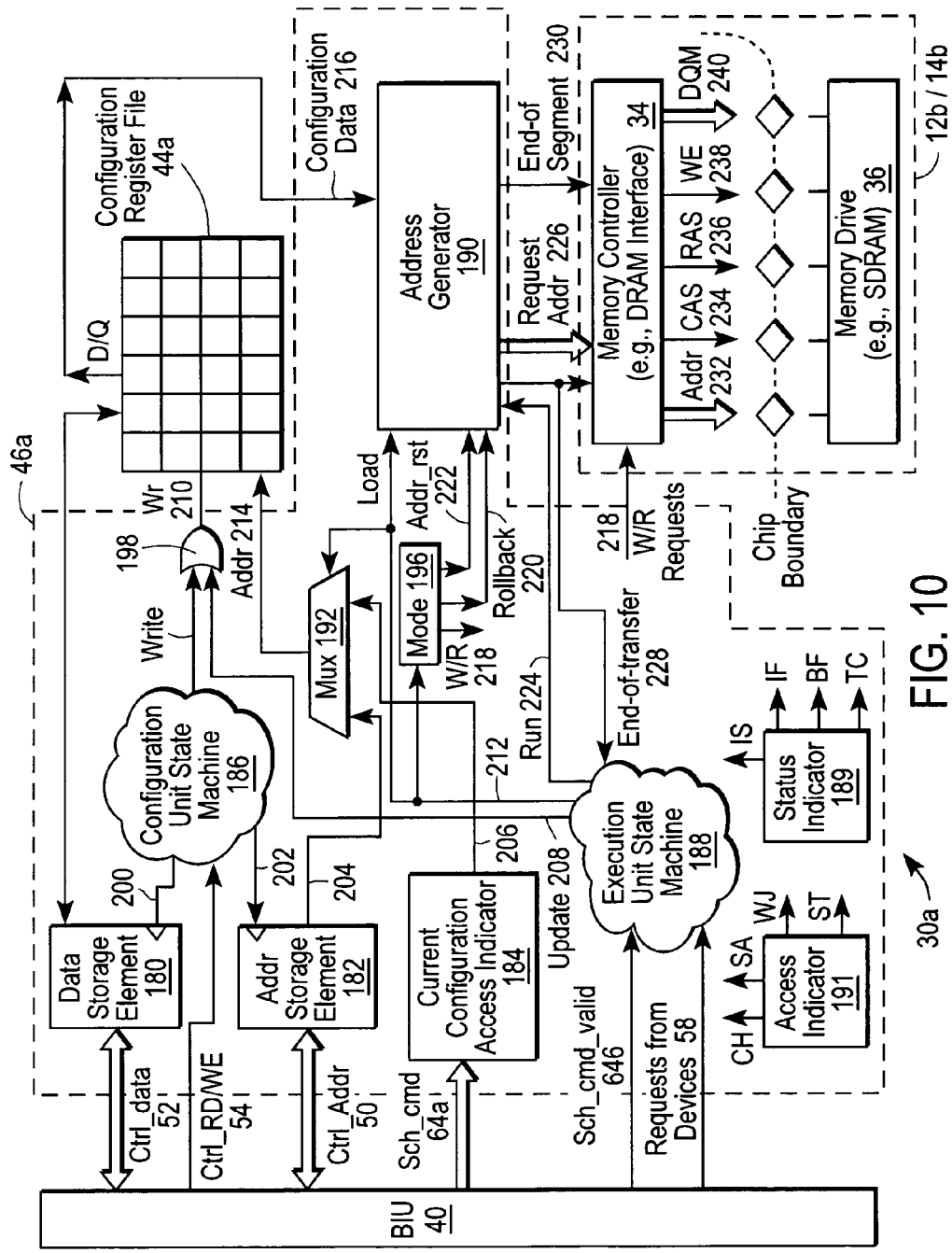
FIG. 10 is a detailed block diagram of the embodiment of the multi-channel data bus controller of FIG. 4.

Referring to FIG. 10 one embodiment of a configuration engine 46a will now be described. Configuration engine 46a includes a data storage element 180, address storage element 182, current configuration indicator 184, configuration unit state machine 186, execution unit state machine 188, status indicator 189, an address generator 190, and an access indicator 191.

The control elements 48 of FIG. 4 include a selection element 192, mode generator 196, and logical operator 198. According to one implementation, selection element 192 comprises multiplexer, and mode generator 196 comprises a register.

The operation of the configuration engine 46a will now be described. The register representing the address storage element 182 temporarily buffers the Ctrl_Addr signal 50 that is received from the control bus 18. The address storage element 182 stores an address index that is provided to the selection element 192. Additionally, the selection element 192 receives an address corresponding to the current configuration data being reference in the configuration register file 44a, namely signal 206 provides selection element 192 an index corresponding to the particular configuration which is to be executed by the configuration engine 46a. The address index is transmitted to selection element 192 (e.g., a multiplexer), which is used to access the particular address location in the configuration register file 44a for reading or writing the corresponding data temporarily buffered in the register for the data storage element 180. Signal line 202 provides an indication to the configuration unit state machine 186 of request to access the configuration register file 44a.

Selector 198 (e.g., OR gate) outputs an active WRITE signal which is used to select the particular entry in the configuration register file 44a corresponding to the address provided from the multiplexer of selector 192. The output of selector 198 writes either the data received from the control bus or associated with the next transfer address to the configuration register file 44a.

The configuration unit state machine 186 coordinates the access to the configuration register file 44a being accessed by the control bus 20. Additionally, the execution unit state machine 188 receives the valid command pulse 64b that is broadcast from the (scheduler) host device 28 after the schedule command 64a, both signals being received by the configuration engine 46a over the scheduling command bus 22. The execution state machine 188 also receives the READ or WRITE transfer requests 58 generated by the devices 38, 40 and sent to the multi-channel data bus controller 30a, depending on the particular data transfer from particular devices. For example, those devices undertaking a data output transfer will generate a WRITE transfer request 58, while other devices undertaking a data input transfer will generate a READ transfer request 58.

The update signal 208 is associated with changing the mode of the data transfer (e.g., DMA transfer). For example, the beginning address of the next transfer should be the ending address of the present transfer. The update signal 208 generally functions to update the beginning address of the configuration register file 44a after a transfer is completed. The configuration data 216 selected from the configuration register file 44a is generally referenced as a D/Q signal to indicate the data-in/data-out relative to the memory device 36, and is forwarded to the address generator 90.

Mode generator 196 controls the behavior of a data transfer in general. Although not explicitly shown, the mode generator 196 receives configuration data from the configuration register file 44a. Additionally, the load signal 212 is provided to the mode generator 196 so as to coordinate the output of a plurality of mode signals produced from the mode generator 196. These mode signals include a WRITE/READ (W/R) signal 218, a rollback signal 220 and an address reset (ADDR_rst) signal 222. In one embodiment, the mode generator may be implemented with registers that in general preserve the values of the configuration register file 44a corresponding to the described modes. The RUN signal 224 indicates that data transfer is being undertaken, and is derived from the schedule command_valid signal 64b and those requests 58 received from devices 38 in the nature of r_req 68 and w_req 66. When the RUN signal 225 is active, the address generator 190 counts up one address, and decrements a counter associated with the total length of data transfer.

The status indicator 189 generally identifies when an interrupt has occurred, and when the controller 30a is busy with a data transfer. Table 5 indicates an exemplary bitmap of a 16-bit read/write register representing the status indicator 189, and having 5 transferring configuration indication bits and 5 interrupt status bits.

TABLE 5

Exemplary Bitmap of Status Indicator Register

| D15 | D14 | D13 | D12 | D11 | D10 | D9 | D8 | D7 | D6 | D5 | D4 | D3 | D2 | D1 | D0 |
|---|---|---|---|---|---|---|---|---|---|---|---|---|---|---|---|
| IF | BF | dc | TC4 | TC3 | TC2 | TC1 | TC0 | dc | dc | dc | IS4 | IS3 | IS2 | IS1 | IS0 |

Figure 23:
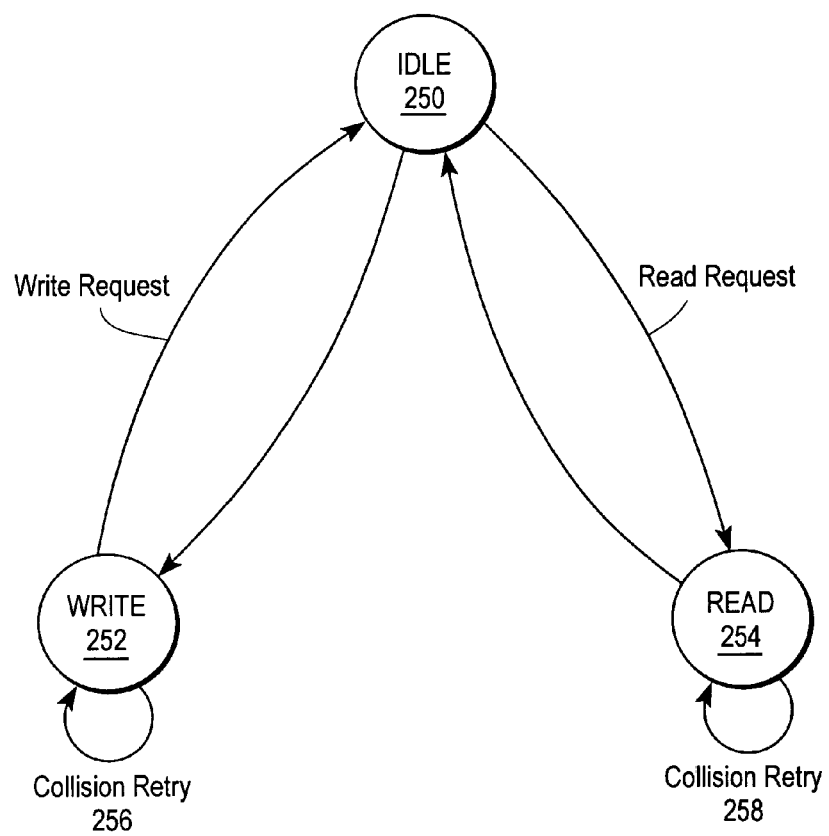
FIG. 23 is a state diagram of the multi-channel data bus controller in accordance with an aspect of the present invention.

Bit D15 represents an interrupt flag (IF) used to indicate that an interrupt of controller 30a as occurred. Bit D14 is a busy flag (BF) used to indicate that a data transfer is in progress. This bit can be set when the controller 30a receives all needed requests and begins transferring data, and can be cleared when the last_transfer signal 72 is received by controller 30a. Bits D12:D8 are transferring configuration bits (TC4:TC0) used to indicate which configuration is associated with a present data transfer. Bits D4:D0 are interrupt status bits (IS) for controller 30a configurations 31 to 0. When an end_of_transfer signal 228 occurs for a specific configuration, the IS bits are set to the ending configuration. Reference is made to FIG. 23 illustrating a state diagram showing three exemplary states of the controller 30a, namely IDLE 250, WRITE 252, and READ 254. The state diagram of FIG. 23 also indicates the process flow for collision retry 256, 258 that accommodates the arbitration of conflicts arising.

Access indicator 191 enables the configuration register file 44a to have a larger bandwidth than the bandwidth of the control bus 18, generally by indexing portions of the configuration register file 44a as follows. The configuration register file 44a is mapped to the control bus address space. The bus and interrupt controller 26 can READ or WRITE the configuration register file 44a at any time. Because the multi-channel data bus controller 30a can modify the configuration register file 44a when a data transfer is complete, an access indicator 191 is used to prevent the overwriting a configuration associated with an executing data transfer. Table 6 indicates an exemplary bitmap of a 15-bit register representing the access indicator 191.

TABLE 6

Exemplary Bitmap of Access Indicator Register

| A14 | A13 | A12 | A11 | A10 | A9 | A8 | A7 | A6 | A5 | A4 | A3 | A2 | A1 | A0 |
|---|---|---|---|---|---|---|---|---|---|---|---|---|---|---|
| 1 | 0 | 1 | 1 | 1 | 0 | 1 | CH4 | CH3 | CH2 | CH1 | CH0 | SA2 | SA1 | SA0 |

Bits A7:A0 represent the configuration numbers, namely 0 through 31. Bits A2:A0 represent the configuration sub-address SA2:SA0. The 64-bit configuration registers can be addressed as five 16-bit registers according to Table 7.

TABLE 7

Access Partition of Configuration

| SA2 | SA1 | SA0 | SA Value | Access Register Bit Range | Effective Bits in Bit Range | Description of Effective Bits (Register) |
|---|---|---|---|---|---|---|
| 0 | 0 | 0 | 0 | [15:0] | 16 | multi-segment register 80a |
| 0 | 0 | 1 | 1 | [31:16] | 16 | base address low |
| 0 | 1 | 0 | 2 | [39:32] | lower 5 | base address high |
| 0 | 1 | 1 | 3 | [51:40] | lower 10 | base count register 84a |
| 1 | 0 | 0 | 4 | [63:52] | lower 12 | mode register 86a |
| 1 | 1 | 1 | 7 | na | na | start dma transfer by xp |

Figure 11:
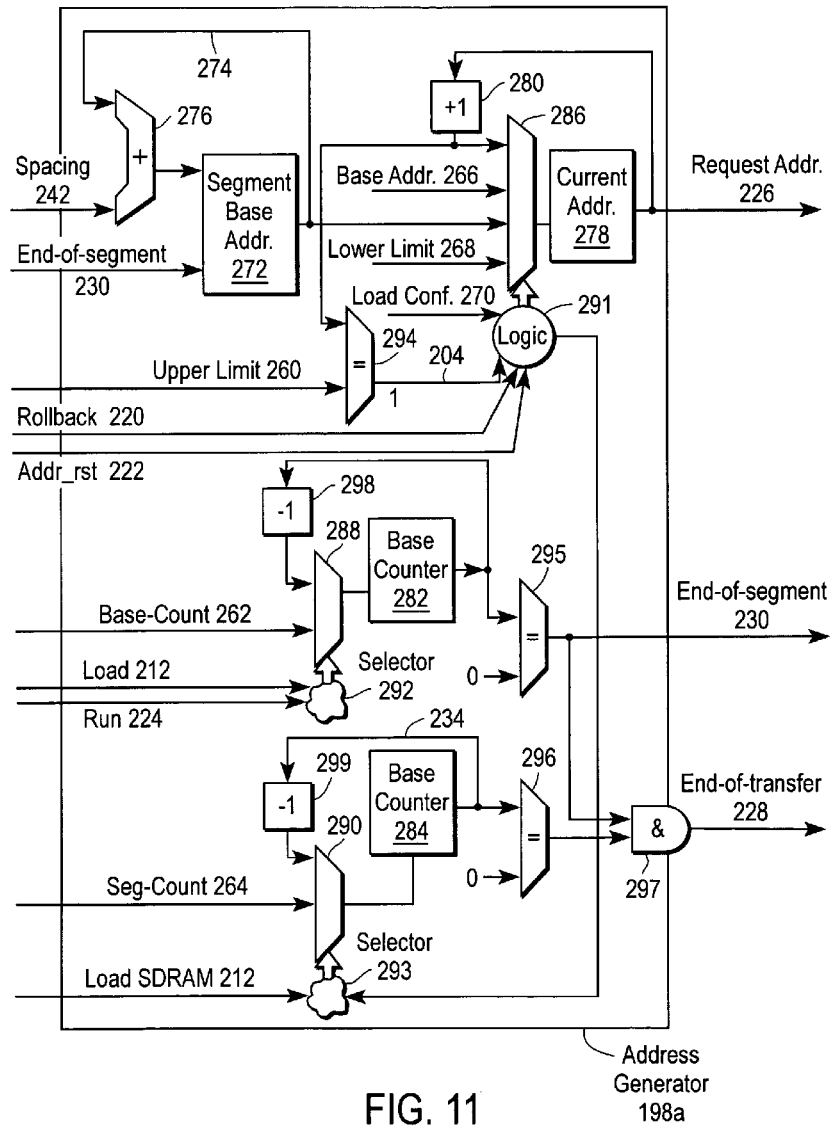
FIG. 11 is a detailed block diagram of one embodiment of an address generator of the multi-channel data bus controller of FIG. 10.

FIG. 11 illustrates a detailed block diagram of one embodiment of an address generator 190a, which provides a request address (Request_addr) 226, end of transfer signal 228, and end of segment signal 230 to memory controller 34. The Request_addr signal 226 informs the memory controller 34 of which physical address should be access in the memory device 36. The components of the address generator 190a are initialized with data received from the configuration register file 44a. The configuration data 216 of FIG. 10 is decomposed into the following signals being received by the address generator 190a: segment spacing 242, upper limit 260, base count 262, segment count 264, base address 266, lower limit 268, and load configuration signal 270. Load configuration signal 270 is signal 212. Although not shown explicitly in FIG. 10, the load (SDRAM) signal 212 and run signal 224 are received by the address generator 190a. The end-of-segment signal 230 will be valid at the end of the transfer of each segment for the multi-segment mode.

Address generator 190a further includes a segment base address register 272 having feedback signal 274 that is used to generate the base address of a subsequent (e.g., next) segment by adding the base address to the segment spacing signal 242 via adder 276 to derive the beginning address of the next segment. The end-of-segment signal 230 is output from the address generator 190a and fed-back to segment base address register 272.

Still referring to FIG. 11, the address generator 190a includes a current address indicator 278 that provides the request address 226 to the memory controller 34. The current address can be increased by a value of one based on increment element 280. Reference is made to Tables 8–9 indicating an exemplary implementation of the current address indicator 278 comprising a 16-bit register and a 5-bit register that are used to form a 21-bit current request address. The current request address represents the current address of a transfer. For example, bits A15:A0 represent the low address word of the current request address which begins a 0x05. Bits A20:A16 represent the high address of the current request address. Unused bits are indicated with "don't cares (de)".

TABLE 8

Low Address Word of Current Request Address

| D15 | D14 | D13 | D12 | D11 | D10 | D9 | D8 | D7 | D6 | D5 | D4 | D3 | D2 | D1 | D0 |
|---|---|---|---|---|---|---|---|---|---|---|---|---|---|---|---|
| A15 | A14 | A13 | A12 | A11 | A10 | A9 | A8 | A7 | A6 | A5 | A4 | A3 | A2 | A1 | A0 |

TABLE 9

High Address Word of Current Request Address

| D15 | D14 | D13 | D12 | D11 | D10 | D9 | D8 | D7 | D6 | D5 | D4 | D3 | D2 | D1 | D0 |
|---|---|---|---|---|---|---|---|---|---|---|---|---|---|---|---|
| dc | dc | dc | dc | dc | dc | dc | dc | dc | dc | dc | A20 | A19 | A18 | A17 | A16 |

A current word count represents the total number of data words to be transferred in the ongoing transfer. The current word count comprises two parts, the current base count represented by the base counter 282, and the current segment count represented by the segment counter 284 in FIG. 11. Table 10 indicates an exemplary register bitmap of the base counter 282 and segment counter 284.

TABLE 10

Exemplary Bitmap of Current Word Count Register

| D15 | D14 | D13 | D12 | D11 | D10 | D9 | D8 | D7 | D6 | D5 | D4 | D3 | D2 | D1 | D0 |
|---|---|---|---|---|---|---|---|---|---|---|---|---|---|---|---|
| S3 | S2 | S1 | S0 | dc | dc | B9 | B8 | B7 | B6 | B5 | B4 | B3 | B2 | B1 | B0 |

In Table 10, bits D15:D12 represent the current segment count (S3:S0), which indicate how many segments and how many words are in a segment. Bits B9:B0 represent the current base count. Both the current segment count and the current base count are preferably automatically loaded in the address generator from the configuration register file 44*a* when a transfer starts. The current base count is loaded with the value of the base word count register 84*a*, while the current segment count is cleared to zero in sequential mode, or is loaded with the value of the segment count Cnt3:Cnt0 (Table 1) from the multi-segment register 80*a* in multi-segment mode. As the data transfer is undertaken, the current word count is decreased once a data word is transferred. In sequential mode, the transfer ends when the value of the current base count decreases to zero. In multi-segment mode, the current base count is then reloaded with the value of the base word count, and the current segment count is decreased by one. Data transfer continues until all data words are transferred.

Address generator 190*a* also includes multiplexers 286, 288, 290 selection combinational-logic 291, 292, 293, comparators 294, 295, 296, and other logic 297, 298, 299 (e.g., AND gate). It will become apparent to those skilled in the art that these components are an exemplary implementation of the described embodiments.

Figure 12:
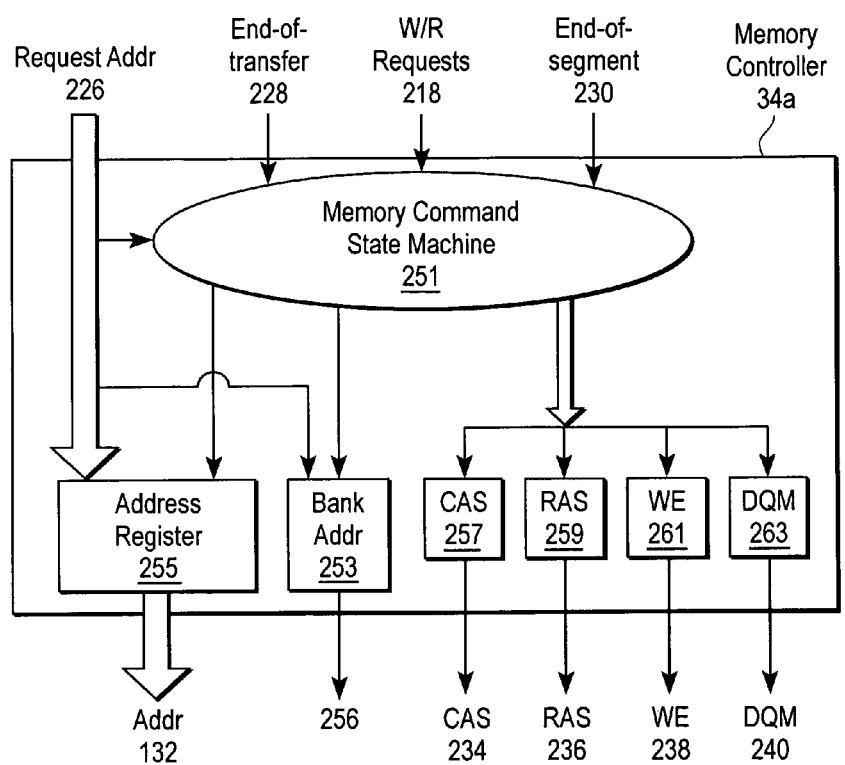
FIG. 12 is a detailed block diagram of one embodiment of the memory controller of FIG. 4.

FIG. 12 illustrates a detailed block diagram of one embodiment of a memory controller 34 that provides an address 232 to the memory device 36, along with other signals to effectuate either a READ or WRITE to the memory device. These signals include column access strobe (CAS) 234, row access strobe (RAS) 236, write enable (WE) 238, and DQM (data-in/data-out mask) signal 240. The CAS 234 and RAS 236 signals are sent to the memory device 36 one part at a time over shared address lines; this enables a minimum number of address lines (e.g., 10-bits) to be used to access the memory device 36 which may have an address size (e.g., 20-bits). The minimization of address lines is well-suited for SOC applications. In general, the DQM signal 240 indicates whether to enable data-out functionality so that a READ from memory device 36 may be undertaken. By disabling data-out functionality, the DQM signal 240 implicitly indicates that the data-in functionality is active, so that a WRITE to memory device 36 may be undertaken. Table 11 lists exemplary signals for the CAS 234, RAS 236, WE 238 and DQM 240.

TABLE 11

Exemplary Address Select Signals

| COMMAND | RAS | CAS | WE | DQM |
|---|---|---|---|---|
| ROW ADDRESS SELECT | Low | High | High | Low |
| COLUMN ADDRESS SELECT | High | Low | High | Low |
| READ | High | Low | High | Low |
| WRITE | High | Low | Low | Low |
| REFRESH | Low | Low | High | dc |

Memory controller 34*a* also includes a memory command state machine 251, which receives the request address 226, end-of-transfer signal 228, W/R requests 218, and end-of-segment signal 230. Memory controller 34*a* further includes a bank address selector 253 selects amongst multiple banks of memory locations associated with the memory device 36. Address register 255 buffers the request address 226 that is used to index the memory device 36. Modules 257, 259, 261, and 263 represent those combination logic required for generating the CAS 234, RAS 236, WE 238 and DQM 240 signals, respectively.

3. Host and Device Buffer Interface Units
   A. Control Bus Signals

In general, Bus Interface Units (BIU) 27 and 40 buffers bus signals between the devices and the control bus. According to the READ protocol, data is latched from the bus at a designated clock. According to the WRITE protocol, data should be put on the bus at a designated clock. Table 12 list various signals and their definitions. Particular implementations of BIU 27 and 40 will be described subsequently.

TABLE 12

Control Bus Signal Definitions

| Ctrl_addr 50 | c-bus address, full address [bits 14:0] |
| Ctrl_rd 53 | c-bus read signal |
| Ctrl_ale 55 | c-bus address latch enable signal |
| Ctrl_we 54 | c-bus write enable signal |
| Ctrl_data 52 | tristate Data of the c-bus |
| Ctrl_io_ready 56 | signal indicating that the I/O cycle has finished |
| last_transfer 72 | indicates a last transfer of the current burst |
| dev_sel | device selected |

The control address (Ctrl_addr) signal 50 indicates the full address using 15-bits, namely 14:0. The Ctrl_rd signal 53 has a value in the Ctrl_ale 55 cycle that indicates the type of the I/O cycle. For example, if the Ctrl_rd signal 53 is valid, the I/O cycle will be a READ. If the Ctrl_rd signal 53 is not valid, the I/O cycle will be a WRITE. The Ctrl_ale signal 55 is an address validation signal, wherein a valid Ctrl_ale signal 55 indicates that a current cycle in an address latch enable cycle. In a control bus WRITE cycle, the Ctrl_we signal 54 will be set to valid by the data bus controller within the same clock (i.e., Mclk 2 phase) with WRITE data. Devices 38 can use the Ctrl_we signal to latch the WRITE data. The Ctrl_data 52 indicates the tristate data of the control bus, which is 16-bits by way of example. The Ctrl_io_ready signal 56 is driven by the accessed device. The device can hold this signal invalid until the READ data is completed. In the WRITE cycle, the I/O will finish in two clock phases, whereupon this Ctrl_io_ready signal is then ignored. In a fixed length mode, when a device 38 transmits a last_transfer 72 signal to controller 30*a*, this last_transfer signal 72 indicates that the current Ctrl_io_ready 56 transfer will be the last transfer of the current burst. This last_transfer signal 72 is driven by the controller 30*a*, which stops the present data transfer operation. This is beneficial over the conventional DMA controllers using fixed lengths transfers because it eliminates the requirement to poll the devices 38 to ascertain the amount of data to be transferred and in response, to program controller 30a with the polled information in order to configure the contoller 30a with the fixed length data to be transferred from the device 38. This requires the intervention of the processor, which increases the processing cost of the data transfer operation. With the present invention, the controller 30a does not need to receive the fixed length of data from the devices 38, but will use the last transfer signal 72 as an indicator to adjust the corresponding base word count indicator.

In the situation where there is a single word transfer, the last_transfer signal 72 remains active. With the dev_sel signal, centralized decoding logic can be used to provide this device selected signal when accessing the assigned device address.

B. Control Bus Protocol

Figure 13:
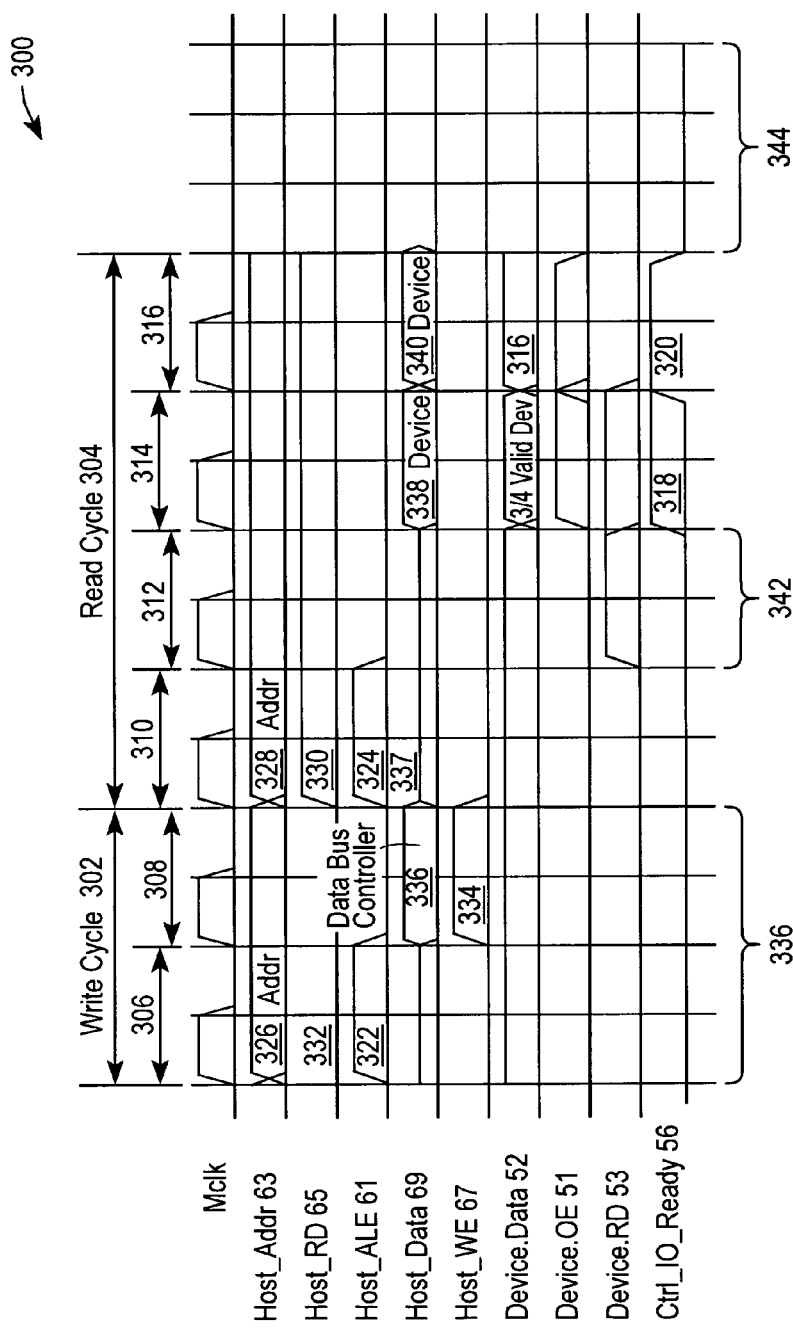
FIG. 13 is a timing diagram of the WRITE and READ access modes in accordance with an aspect of the present invention.

Reference is now made to the timing diagram 300 of FIG. 13 to describe the control bus protocol. Throughout FIG. 13, reference will be made to a "host device", representing the bus and interrupt controller 26 which is functioning as a master device communicating with the various "client devices" in the nature of the devices 38 and the multi-channel data bus controller 30a. Although the client devices may be any of the devices 38 and controller 30a, in the following discussion, reference to the client device is intended to refer to the multi-channel data bus controller in order to avoid obscuring the invention with unnecessary details. The control bus protocol includes a WRITE cycle 302 and a READ cycle 304. Each of these cycles 302, 304 can be further divided into phases as described below.

For a WRITE cycle 302, the first phase is generally an address phase 306. Following the address phase 306 is the data phase 308. For single word WRITE access, there is typically one data phase 308. By contrast, for a burst word operation, the total number of data phases 308 can be four, eight, sixteen, all typically ending the WRITE cycle 302 with a valid last_transfer signal 72.

For a READ cycle 304, the first phase is an address phase 310. Following this address phase 310 are data phases 312, 314, 316, where a corresponding client device will drive data 314 with an active 318 (valid) Ctrl_io_ready signal 56. Alternatively, the client device can drive data 316 with a valid Ctrl_io_ready signal 56, which indicates that the client device is capable of driving the Ctrl_data signal 52 at one or more of the data phases 316, 318 as shown in FIG. 13. Although only a few data phases 312, 314, and 316 are shown in FIG. 13, it will be appreciated that with the READ cycle 304, there can be one, four, eight, and sixteen data phases, by way of example, all typically ending the READ cycle 304 with an active last_transfer signal 72 transmitted to the client device.

The address phases 306 and 310 in the respective cycle are each indicated as being valid 322, 324, respectively, based on the host address latch enable (Host_ALE) signal 61 from the bus and interrupt controller 26. The Host_ALE signal 61 is valid 322, 324 preferably for one clock phase. In the address phases 306, 310 of the READ, WRITE access cycles, respectively, the multi-channel data bus controller 30a drives 326, 328 the address bus (Host_addr) 63 for the input or output (I/O) address that the respective READ cycle 302 or WRITE cycle 304 will access. The controller 30a also indicates whether the cycle 302, 304 is a READ or a WRITE cycle, respectively, by asserting a data bus READ (Host_Rd) signal 65. If the Host_Rd signal 65 is a logical 1, as indicated by 330, the I/O cycle is deemed to be a READ cycle 304. Otherwise, if the Host_Rd signal 65 is a logical 0, as indicated by 332, the I/O cycle is deemed to be a WRITE cycle 302. If the I/O cycle is a WRITE cycle 302, controller 30a will drive the host write enable (Host WE) signal 67 to be valid 334, as well as WRITE data 336 onto the Host_Data line 69, which typically is a tristate bus. The client device is capable of buffering the WRITE data 336 and will complete this operation in the next clock 310. In the situation where a burst WRITE occurs, the WRITE cycles 302 are preferably consecutive, and the starting address is preferably aligned. The data bus controller 30 typically ignores 336 the Ctrl_io ready signal 56 during a WRITE cycle 302. The Device.OE signal 51 represents an operational enable signal indicating that the client device is operational.

In the data phase (e.g., 314) of a READ cycle 304, the client device addressed will drive the READ data 338 onto the tristate data bus, along with a valid Ctrl_io_ready signal 318. The client device may similarly drive the READ data 340 on the data bus in another data phase 340 along with a corresponding valid Ctrl_io_ready signal 320. It follows that a data phase 312 occurring with an invalid Ctrl_io_ready signal 342, 344 should preferably be deemed as an invalid data phase. The client device can then use the invalid Ctrl_io_ready signal 344 to hold the READ cycle 304 for up to the maximum number of clocks in the cycle (e.g., 15 clocks). Any delay larger than this maximum number should cause a time-out I/O error in the multi-channel data bus controller 30a, which can be treated as a non-recoverable hardware interrupt, to which a global reset should be undertaken. In the situation of a burst READ cycle, the data phases may be four, eight and sixteen phases, either consecutive in one embodiment or non-consecutive in an alternate embodiment. Preferably, the starting address is aligned.

C. Host Buffer Interface Unit for Bus & Interrupt Controller

Figure 14:
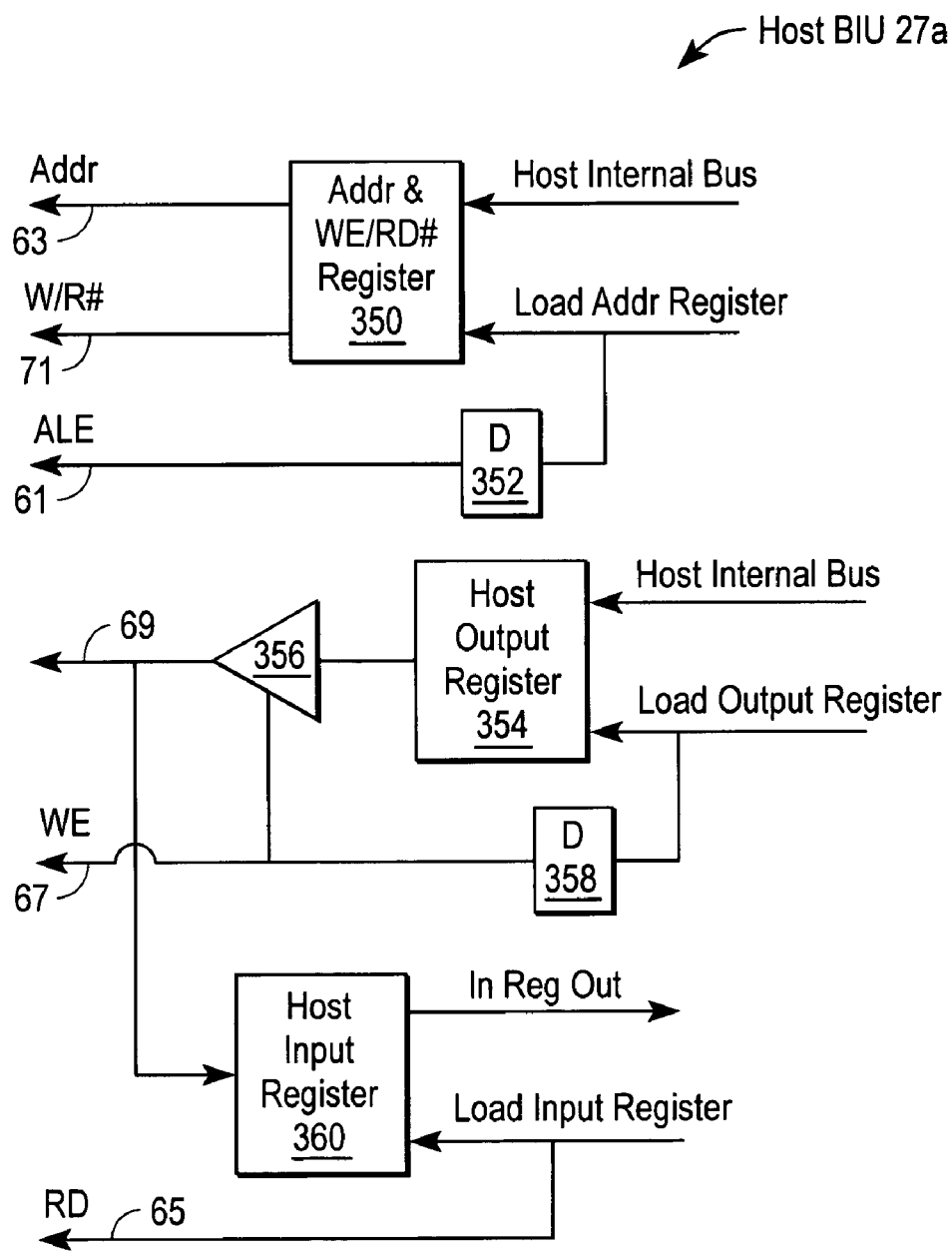
FIG. 14 is a block diagram of a host bus interface unit for the bus and interrupt controller of FIGS. 2–3.

FIG. 14 illustrates an exemplary implementation of a host BIU 27a, that is a part of the bus and interrupt controller 26. BIU 27a includes an address & WE/RD# register 350, a delay element 352, host output data register 354, output buffer 356, delay element 358, and host input data register 360.

Both the READ cycle 302 and WRITE cycle 304 are preferably initiated by the controller 26, upon which controller 26 will take ownership of the control bus 18. Both the READ and WRITE cycles 302, 304, respectively, are preferably non-interruptible in the controller 26, that is, once the controller 26 issues 322, 324 an ALE signal 61, there should be a guarantee that the WRITE cycle 302 and the READ cycle 304 should each end in their corresponding predetermined number of phases.

By way of example, if the WRITE cycle 302 has two phases, and the READ cycle 304 has three phases, in the WRITE cycle 302, the host will first drive 322, 326 the ALE signal 61, W/R# signal 71, and the Addr signal 63. The ALE signal 61 will be valid 322 for one clock. The W/R# signal 71 and Addr signal 63 will be valid 326 until the next cycle (whether it is a READ or WRITE) begins with another ALE signal 61. In the next cycle, the host will drive 334 the WE signal 67 valid, and drive 336 the data 65 onto the data bus 20 for one clock. Because the controller 26 will release 337 the data bus in the next clock, the addressed client device must latch the data in this clock. The WRITE cycle 302 ends after this clock, 310.

The READ cycle 304 includes outputting 328 the address 63, indicating 330 the cycle type being a READ cycle, waiting for one clock 312, and loading 338 the host input data register.

Both the READ and WRITE cycles are preferably uninterruptible, and after these operations, the data in the output data register is already written to the client device. The input data register holds the data read from the client device. Because after a READ cycle 304, the controller 26 may be interrupted before it uses the data in the input data register, the interruption service should preferably save (e.g., push) the input data register, and restore it upon return from the interrupt. Further details about the operation of BIU 27a are described in U.S. application Ser. No. 10/033,857, filed Nov. 2, 2001, the subject matter of which is incorporated by reference herein.

D. Device Buffer Interface Unit for Multi-Channel Data Bus Controller

Figure 15:
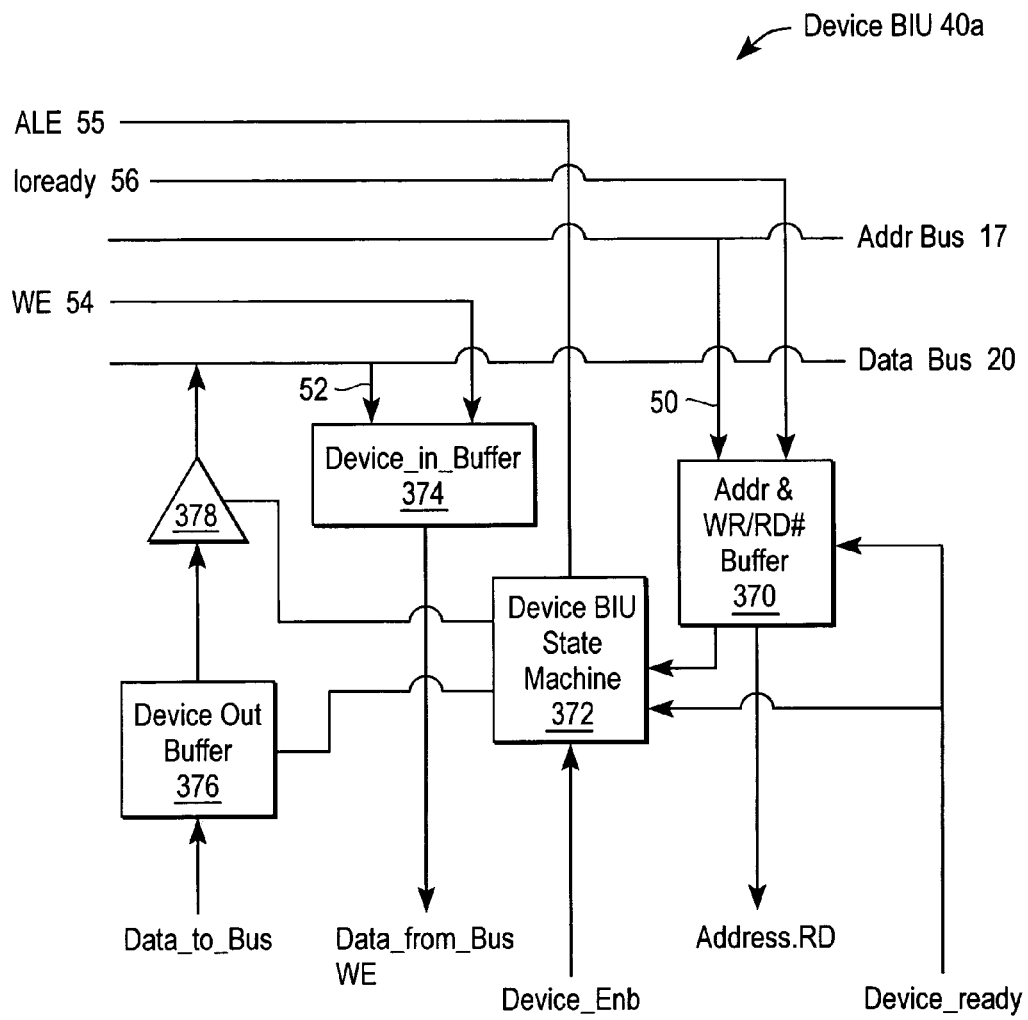
FIG. 15 is a block diagram of the device bus interface unit for the multi-channel data bus controller and devices of FIGS. 2–3.

FIG. 15 illustrates an exemplary implementation of a BIU 40a, that is a part of the multi-channel data transfer controller 30a and the devices 38. BIU 40a generally functions as the client BIU communicatively coupled to the host BIU 27a. BIU 40a includes an address & WR/RD# buffer 370, a state machine 372, a input buffer 374, and output buffer 376, and a tristate latch enable buffer 378. The operation of BIU 40a is described in more detail in U.S. application Ser. No. 10/033,857, filed Nov. 2, 2001, the subject matter of which is incorporated by reference herein.

4. General Operation of Data Transfer Operation

The data transfer in accordance with the present invention can be initiated using a set of parameters stored in the configuration register file 44a either by hard-wired request from the scheduler 28, or by a software start command.

Figure 16:
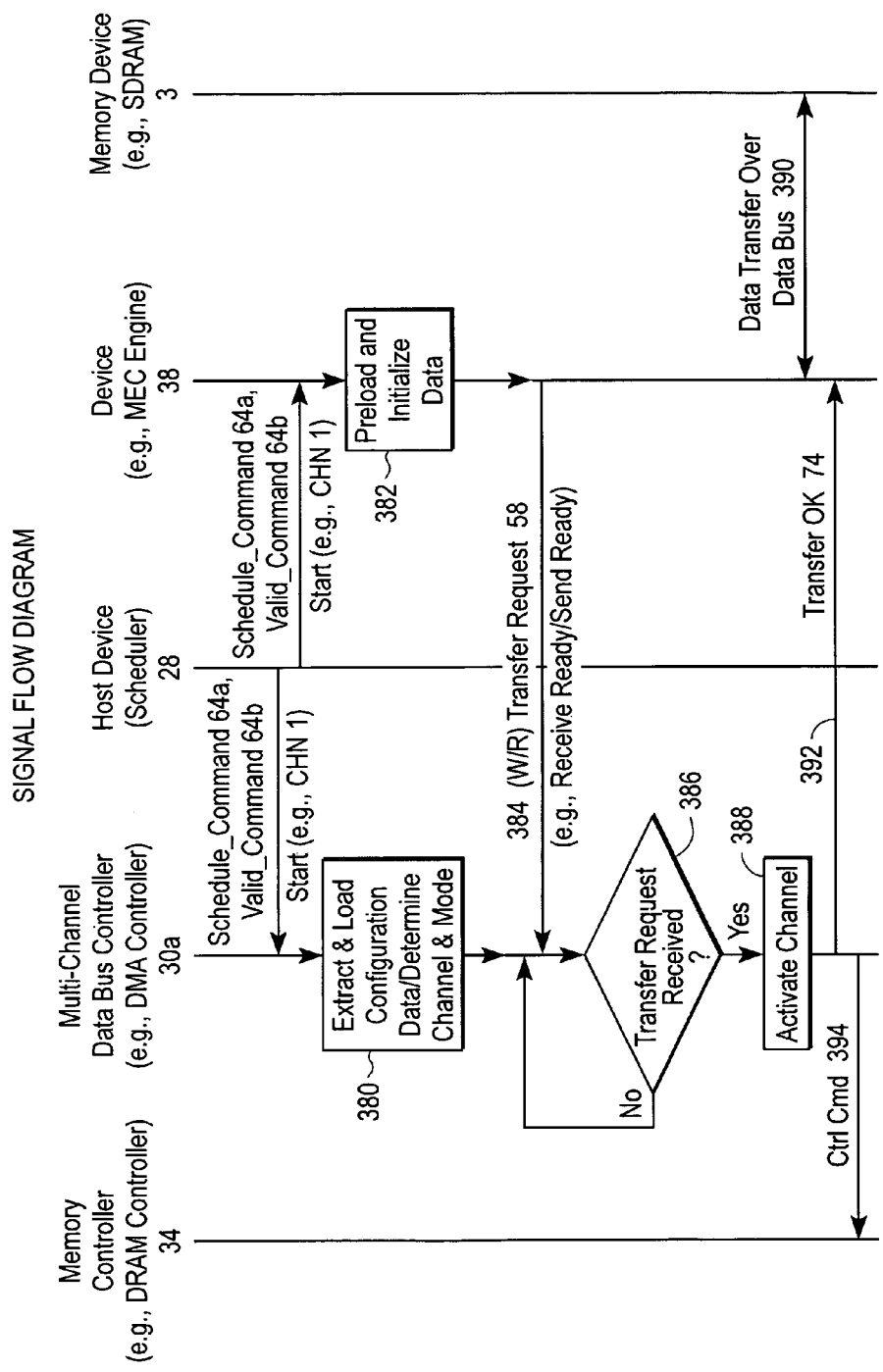
FIG. 16 is a signal flow diagram and chart of one embodiment of an exemplary process for activating a channel for data transfer in accordance with an aspect of the present invention.

To start the data transfer by hard-wired request, the scheduler 28 preferably provides the number of the configuration to the scheduling bus 22 with an asserted schedule command valid signal. FIG. 16 illustrates a signal flow diagram and chart detailing the operation of how a channel is established in accordance with one aspect of the present invention. In order for a device 38 to access the memory device 34 in either a READ or WRITE data transfer, the scheduler 28 broadcasts a schedule command 64a and a valid command 64b as described in detail in U.S. application Ser. No. 10/033,857, filed Nov. 2, 2001, the subject matter of which is incorporated by reference herein. These commands 64a, 64b indicate a start of channel 1, by way of example. In response, the controller 30a loads 380 the channel configuration data into the configuration register file 44a. Also, the requesting device 38 preloads 382 and initializes either a READ or WRITE request command for memory device 36. The device sends 384 a W/R transfer request 58 to controller 30a, which in turn parses request 58 into a wreq 66 or a rreq 68 as seen in FIG. 4. Once the controller 30a receives 386 the W/R request, the configuration register file is accessed to activate 388 the channel for the data transfer, and the data transfer is undertaken 390. After the last_transfer signal 72 is received by the controller from the device 38, the controller 30a sends 392 a transfer_ok signal 74 to the device 38. It is noted that the transfer_ok signal 74 can be used to indicate the completion of data read from a memory device to another device, or of data written to a memory device, by way of example. The controller 30a then transmits 394 a control command to the memory controller 34.

To start the data transfer by software command, the bus and interrupt controller 26 preferably issues a WRITE to the configuration register file 44a with the corresponding configuration number on CH4:CH0 in Table 6. The multichannel data bus controller 30a then awaits the request from the participating devices 38, and starts the transfer as soon as the request(s) are valid.

Figure 17:
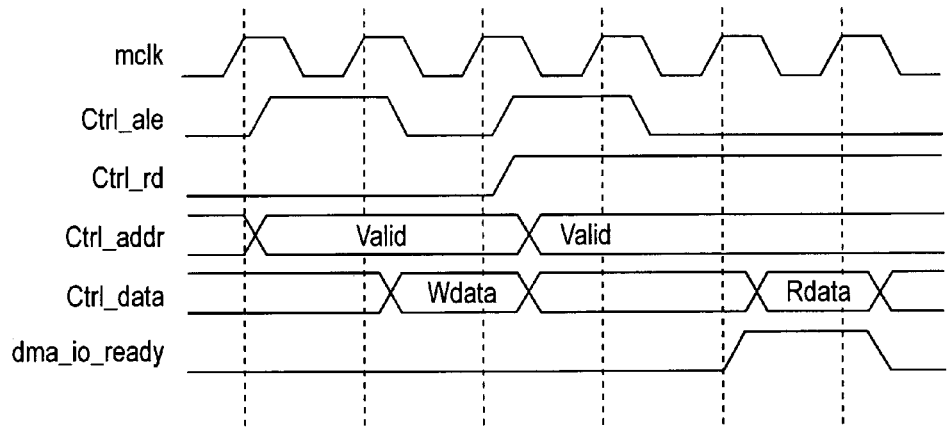
FIG. 17 is a timing diagram of the control access for WRITE and READ requests in accordance with an aspect of the invention.

FIG. 17 is a timing diagram of WRITE and READ requests transmitted from a device 38.

Figure 18:
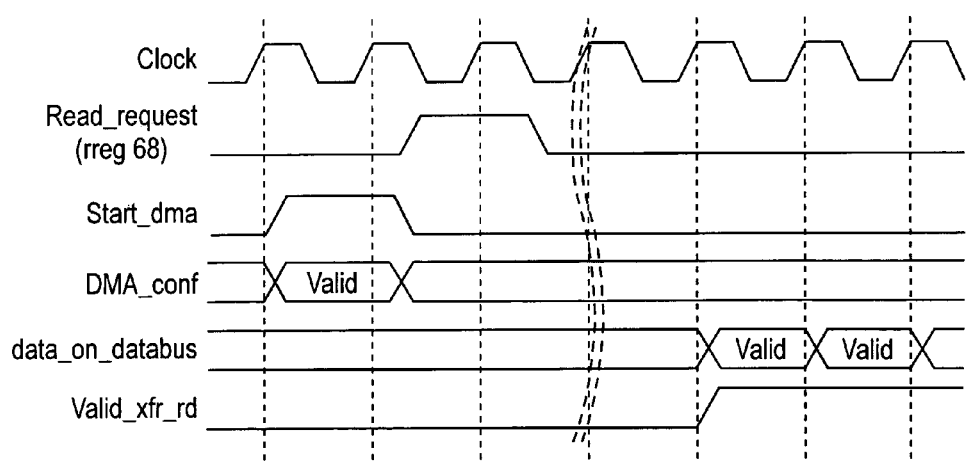
FIG. 18 is a timing diagram of a READ transfer being initiated.

FIG. 18 is a timing diagram of a READ transfer being initiated. The Start_dma signal represents the schedule command signal and the DMA configuration (DMA_conf) signal represents the schedule valid signal broadcast by the scheduler 26 as described in U.S. application Ser. No. 10/033,857, filed Nov. 2, 2001, the subject matter of which is incorporated by reference herein. The valid_xfr_rd signal is generated by the controller 30a for a READ transfer, and when active, there should be valid data read from the memory device 36 to the data bus 20.

Figure 19:
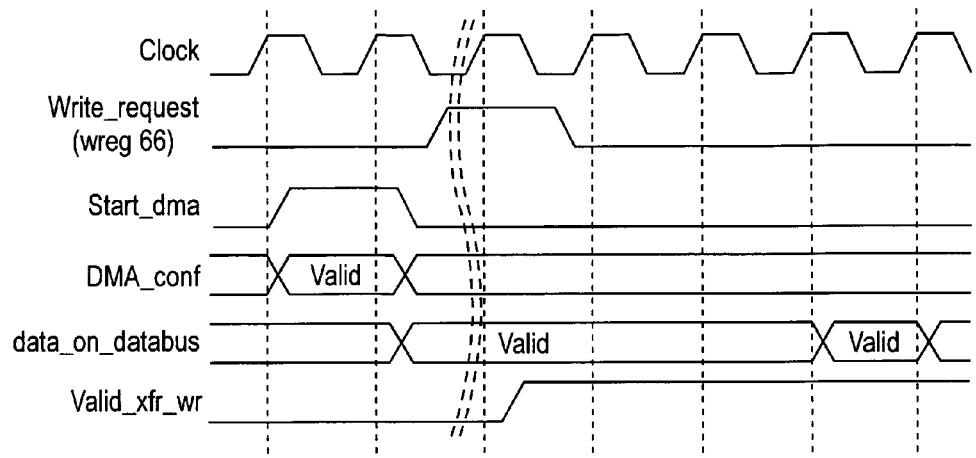
FIG. 19 is a timing diagram of a WRITE transfer being initiated.

FIG. 19 is a timing diagram of a WRITE transfer being initiated. The valid transfer write (Valid_xfr_wr) signal becomes active two clocks before the data is WRITTEN to the memory device 36. This allows other devices 38 to prepare data for the transfer.

Figure 20:
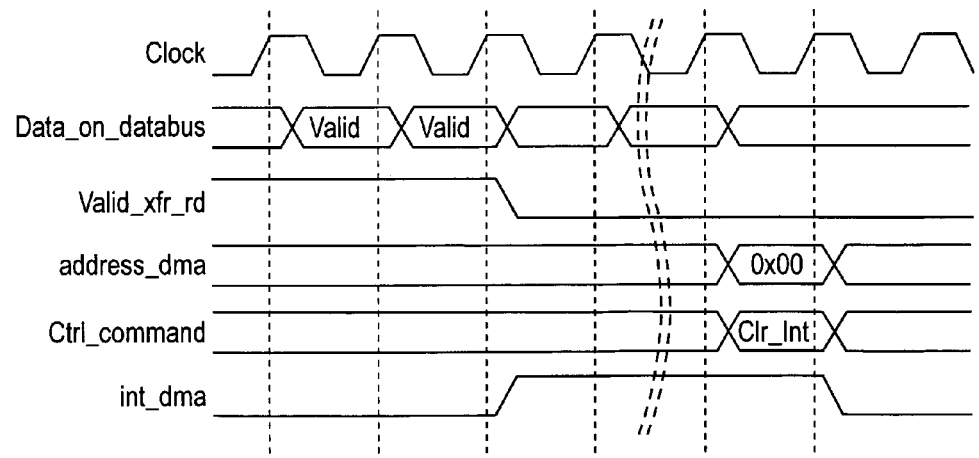
FIG. 20 is a timing diagram of the end of a READ transfer.

FIG. 20 is a timing diagram of the end of a READ transfer. When the READ transfer is completed, the Valid_xfr_rd signal goes low, and the interrupt dma (int_dma) signal goes high, unless a mask of the interrupt request is activated. The bus and interrupt controller 26 writes an interrupt command to the controller 30a to reset the signal, as discussed in Table 5 with IF bit of the status indication register.

Figure 21:
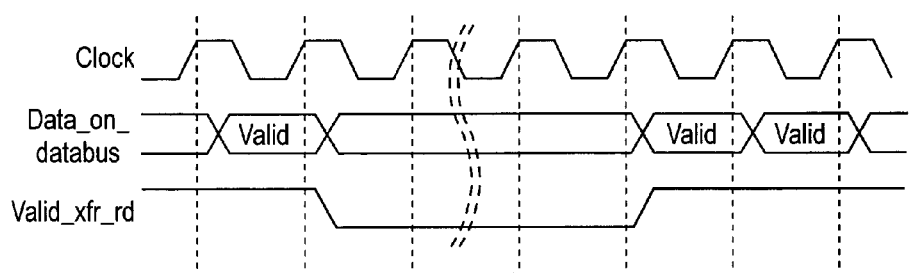
FIG. 21 is a timing diagram indicating a READ transfer being interrupted by a page boundary or a DRAM refresh.
Figure 22:
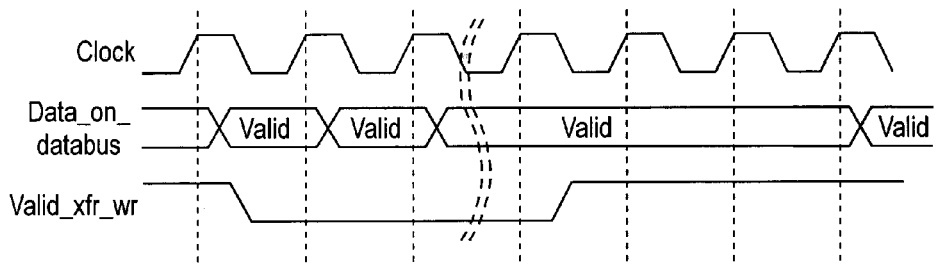
FIG. 22 is a timing diagram indicating a WRITE transfer being interrupted by a page boundary or a dynamic random access memory (DRAM) refresh.

FIG. 21 is a timing diagram indicating a READ transfer being interrupted by a page boundary or a DRAM refresh. This type of interruption typically occurs when the access to the memory device 36 is interrupted due to the break in cycles when accessing amongst the row and column access strobes of the memory device. Similarly, FIG. 22 is a timing diagram indicating a WRITE transfer being interrupted by a page boundary or a DRAM refresh.

It is noted that the previously described embodiments reference exemplary implementations being well-suited to work with a variety of data being transferred amongst devices in a system 10.

One Embodiment of a Video Processing System Including a System for Selectably Enabling Multi-Channel Data Transfer Operation and Access Modes FIG. 24 illustrates one implementation of the system 10 for selectably enabling multiple-channel (multi-channel) data transfer operation and access modes applied to a video processing system 400 in order to perform video compression of moving images as part of an encoding process. The multiple-channel data transfer operation and access modes are advantageous for controlling the transfer of raw (e.g., compressed) data in the nature of video images. By way of example, these video images are typically associated with frame sizes of 720×480 (PAL) and 704×576 (NTSC) at same bit rate, and blocks of 4×4, 9×9, and 16×16 pixels.

In the implementation of FIG. 24, system 400 includes a processor-based platform 402 (back end sub-system 402), and a front end sub-system 404. Data from source 406 is received by an audio/visual (A/V) interface 408. The front-end sub-system 404 includes function blocks to provide the data processing method for video compression. The back-end sub-system 402 provides the data and control information traffic as well as the overall control and scheduling for the function blocks of the front end sub-system 404. The back end sub-system 402 also provides the communication and data stream output to the external host 410.

The AV interface 408 is synchronized with a pixel clock PCLK (not explicitly shown), which may be operating at a low frequency, like 27 MHz by way of example. A data (pixel) bus 412 allows the transfer of pixel data from the source 406 to the AV interface 408. Every clock cycle, a pixel can be input through the pixel bus 412 with a valid pixel signal. Those skilled in the art will recognize that the input timing can be controlled by horizontal and vertical synchronize signals. A control bus 411 and a scheduler command bus 413 communicatively couple the front end 436 to the back end 402.

The source 406 may be a multitude of devices that provide a digitized video bit stream (data stream), like for example, from a Complementary Metal Oxide Semiconductor (CMOS) device or Charge Coupled Device (CCD) sensor (with or without glue logic) like that used in a digital camera and PC camera. Other types of source devices that may work suitably well with the present invention, include by way of example, the Philips® 711x video digitizer and processor chip. By way of background information, in a digital camera, CCDs can be analogized to operating like film. That is, when they are exposed to light, CCDs record the intensities or shades, of light as variable charges. In the field of digital cameras, the charges are converted to a discrete number by analog to digital converters. It will be recognized that other types of sources capable of generating a digitized video bit stream may work suitably well with the present invention, including sources in the nature of a personal video recorder, a video-graphics capture and processor board, and a digital CAM recorder.

In general, source 406 generates an uncompressed video data bit stream 414, which may be of multiple formats. By way of example, the format of data stream 414 can comply with the CCIR (Consultative Committee for International Radio, now ITU-R) 601 recommendation which has been adopted worldwide for uncompressed digital video used in studio television production. This standard is also known as 4:2:2. Also, data stream 414 may be the parallel extension standard, namely CCIR 656 with PAL and NTSC, which had been incorporated into MPEG as the Professional Profile. CCIR 656 sets out serial and parallel interfaces to CCIR 601. Other suitable video formats include: YUV 4:2:2 interlace; 8-bit YUV with Vsysnc/Hsysnc/Fodd or Vref/Href format, interlace and progressive; 10-bit RGB Bayer with Vsysnc/Hsync CMOS sensor format. The support size can vary from 352×288 to 720×480 (30 fps) or 720×576 (25 fps), while the support input frame rate can vary from 10 fps to 30 fps. It is noted that these values are provided by way of example, and that the invention is not limited to these formats and parameters, but may work suitably well with other types of formats and parameters. When data stream 414 includes an audio component, the format of the data stream could also be in IIS (inter IC signal) format. Of course, the appropriate IIS data rates, which typically are at speeds of several Mbits/second, may be selected for transferring audio data. It will be appreciated that CCIR 656 and IIS are only examples of possible digital data formats, and that other formats are equally possible. A/V interface 408 includes necessary ports and circuitry to receive the incoming (video and/or audio) signals and to buffer data from such signals.

The base platform 402 is preferably a general microprocessor-based computing system. In one implementation, the electronics of platform 402 are implemented as a single ASIC incorporating a processor 416, a system controller 418, memory device 420, memory device controller 422, a multichannel (e.g., Direct Memory Access DMA) controller 424, an input/output (I/O) interface 426, a scheduler host device 428, and an extensible program interface 430.

Exemplary applications suitable for the incorporation of system 400 include digital video recorders, remote video surveillance systems, video capture boxes, small portable handheld devices such as digital cameras, multimedia-enabled cellular phones and personal digital assistants (PDAs), and other media-based devices and appliances. The (XRISC) bus and interrupt controller 418 handles the workflow of the data and control signals for the computing processes of CPU 416, including for example, handling hardware and software interrupts, as well as those I/O signals generated.

Memory device 420 may be any suitable computer memory device for storing picture data, such as a video random access memory (VRAM), dynamic RAM (DRAM) device, or SDRAM under the control of memory device controller 422. Memory device 420 is shown as being external to platform 402 in FIG. 15, but may be integrated into platform 402 in other embodiments of system 400. In one embodiment where memory device 420 is a DRAM, controller 422 is selected to be a corresponding DRAM controller performing the physical transfers of data between the memory device 420 and the multichannel controller 424. In this embodiment, controller 424 may be a DMA controller selected to accommodate any suitable number of DMA channels used to transfer the retrieved video data into packed pixel format or planar bit maps, for example, from the memory device 420 to each data block for processing by the MEC engine 432. Table 13 list exemplary indicates exemplary multiple channel DMA organization parameters, which can be preprogrammed independently for the start address, burst length, and burst mode registers.

TABLE 13

Exemplary DMA Channel Organization

| DMA Channel | Description | Address Generator | Source | Destination |
| --- | --- | --- | --- | --- |
| DMA Channel 0 | Raw video data input | Video Input Processor (VIP) | Video Input Processor (VIP) | DRAM input frame buffer |
| DMA Channel 1 | Macro-block data to be encoded and reconstructed reference frame | MEC data streamer | MEC_DCT SRAM | DRAM input frame buffer & reference frame buffer |

TABLE 13-continued

Exemplary DMA Channel Organization

| DMA Channel | Description | Address Generator | Source | Destination |
|---|---|---|---|---|
| DMA Channel 2 | Encoded stream output & Constant table loading | VLC stream address generated by the VLC bit-rate controller, Loading address generated by XRISC | $Q/Q^{-1}$_VLC SRAM | DRAM stream buffer, DRAM Constant table space |
| DMA Channel 3 | Output Stream | XRISC | DRAM stream buffer | I/O output FIFO |

Extensible program interface 430 enables data to be loaded into system 400 from flash memory device 434.

The video processing system 400 includes several devices to be controlled by the scheduler host device 428. These devices include MEC engine 432, a compression engine 436, a memory controller engine 438, and the external host 410. MEC engine 432 includes a motion estimation and motion compensation array 440, stream buffer 442 and SRAM 444. Compression engine 436 includes a discrete cosine transform (DCT) and inverse DCT (IDCT) module 446, a quantizer and dequantizer module 448, a variable length coding (VLC) encoder 450, and buffers such as block SRAMs 452, 454. Additional details of the video compression techniques for video processing system 400 are disclosed in: (1) U.S. application Ser. No. 09/924,079, entitled "Cell Array and Method of Multiresolution Motion Estimation and Compensation," filed Aug. 7, 2001, the subject matter of which is hereby incorporated by reference in its entirety; and (2) U.S. application Ser. No. 09/924,140, entitled "DCT/IDCT With Minimum Multiplication," filed Aug. 7, 2001, the subject matter of which is hereby incorporated by reference in its entirety.

In general, the scheduler host device 428 generally functions as a timing mechanism enabling the scheduling and synchronization of operations and data transfers that are intended to be performed by particular ones of the devices 432, 436, 438, and 410, by way of example. Exemplary operations and data transfers can include performing motion estimation and compensation, discrete cosine transforms, inverse discrete cosine transforms, quantization, inverse quantization, variable length coding encoding, direct memory access control, the loading of predetermined data and firmware by the external host 410.

For example, where the MEC engine 432 needs to share on-chip SRAM with other modules (e.g., DCT/IDCT 446), programmable scheduler host device 428 coordinates the operation of various modules and processes in system 400 in a manner as already described. The commands issued by the scheduler host device 428 as part of the back end sub-system enables the synchronization of devices, such as 432, 436, 438, and 410 to accomplish the video compression and encoding tasks. For example, in accordance with one embodiment of the present invention, MEC engine 38 interfaces with an external DRAM 420 to obtain picture data and to store processed picture data over databus 412. Picture data read from the DRAM 420 is received by the array 440 from the SRAM 444. The array 440 is enabled to perform calculations on the data received, and because stream buffer 442 functions as a programmable cache, contemporaneous with such array processing, additional data can be preloaded from DRAM 420 into the SRAM 444 for the next set of processing operations. Stream buffer 442 thus enables the MEC array 440 to perform motion estimation processing and when the array 440 is not accessing the stream buffer 442, the stream buffer can pre-fetch data from the memory device 420 for the next MEC operations in parallel. The operations and data transfers necessary to accomplish the MEC processing are exemplary of the event commands and time-tags that can be controlled and synchronized by the scheduler host device 428.

Those skilled in the art will recognize that the blocks of FIG. 24 are functional blocks that may be implemented either by hardware, software, or a combination of both. Given the functional description of these blocks, those of ordinary skill in the art will be able to implement various components described using well-known combinational and/or sequential logic, as well as software without undue experimentation. Those skilled in the art will appreciate that the present invention is not limited to the video compression system described above, but is applicable to any video processing system.

Figure 25:
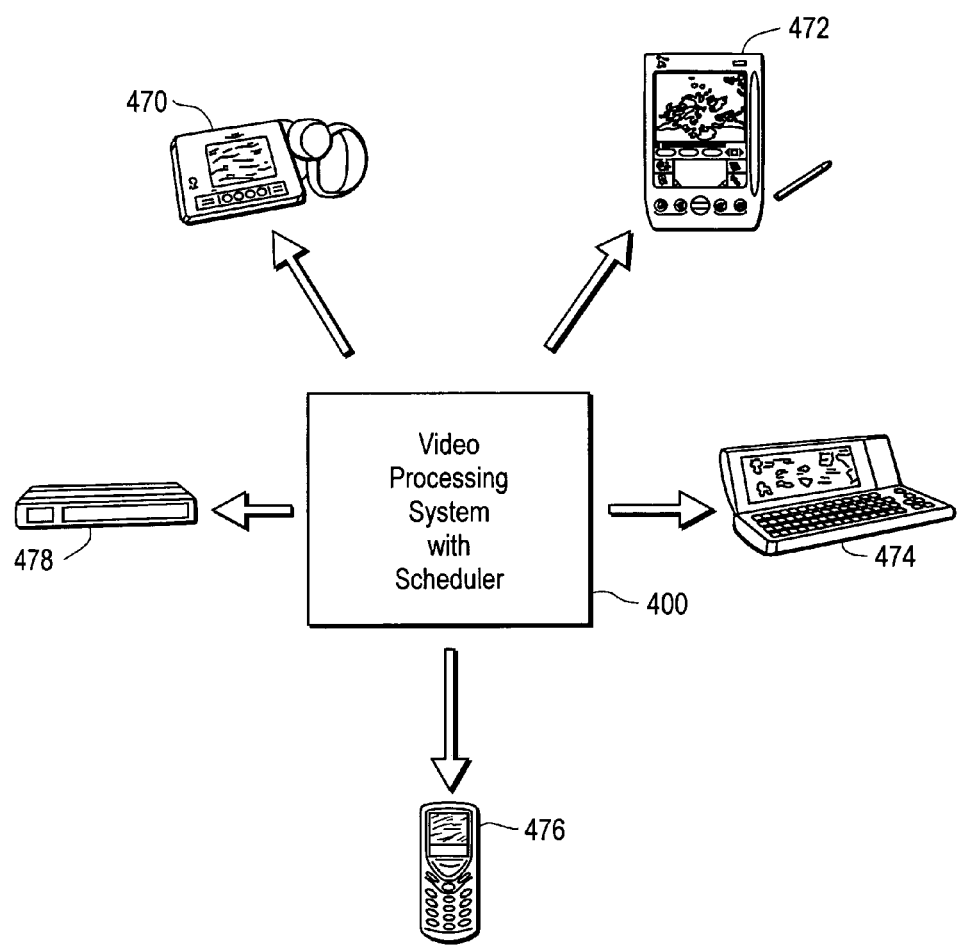
FIG. 25 is an illustration of various exemplary applications that work suitably well with the video processing system of FIG. 24.
Figure 26:
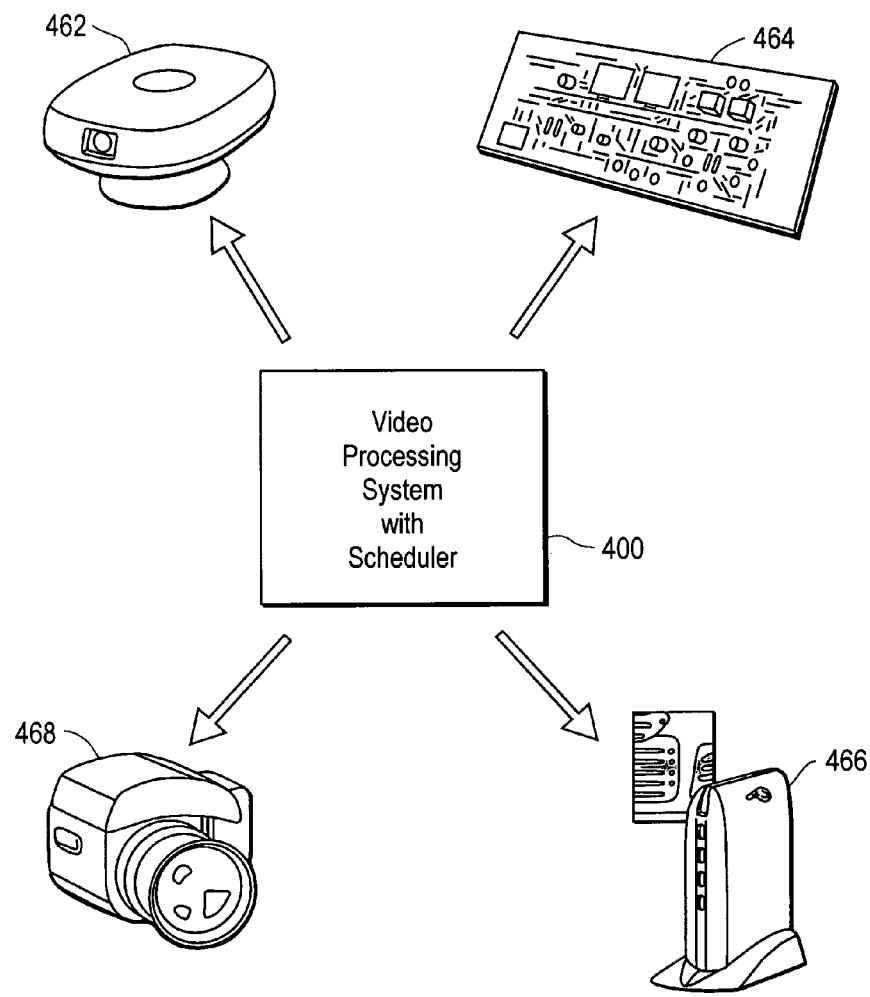
FIG. 26 is an illustration of additional exemplary applications of FIG. 25.

FIGS. 25–26 are illustrations of various exemplary video processing applications in which the video processing system 400 incorporating the system 10 of the present invention will work suitably well. Such applications include a high quality PC video camera 462 used for video conferencing or as a video recorder. Another application includes video capture boards 464, which may be enabled with MPEG-1, MPEG-2, MPEG-4, H.263 and H.261 capability. Yet another application includes a video capture box 466 which may be enabled with MPEG-1, MPEG-2, MPEG-4, H.263 and H.261 capability, by way of example. Video capture boxes 466 can also be used for time shifting purposes. Still another application comprises an IP (Internet Protocol)-based remote video surveillance system 468 outputting MPEG-1, MPEG-2, MPEG-4 or other type of video format.

In FIG. 26, other applications that are well-suited for video processing system 10, include the following: (1) high quality video cameras 470 with full D1 broadcasting quality; (2) personal digital assistants 472 operable as a video camera or as a visual communication device; (3) mobile visual communication devices 474; (8) portable wireless telephones 476 enabled to operate with visual communication by MPEG-4 over CDMA; and (9) personal video recorders (PVRs) 478 also known as digital video recorders (DVRs), and STB, along with other devices providing a home video gateway, visual conferencing and multimedia communication. It will be appreciated by those skilled in the art that the above-mentioned types of applications are only examples, and that the present invention works suitably well with a wide variety of applications. For example, the present invention may be used with the appropriate wireless communication medium (e.g., radio frequency signals, infrared signals) for wireless transmission of signals.

The system 10 can be implemented with the particular hardware implementations described by way of example. However, even though the system 10 has been described with respect to the specific architecture disclosed, it will be appreciated that the system 10 of the present invention may work suitably well with other architectures of video processing systems. Further, the system for selectably enabling multi-channel data transfer modes has a wider application than the video processing techniques described herein. Similarly, the application of the present invention is not limited to only performing the sequence of steps described in figures presented. Those skilled in the art will understand that the system 10 may operate suitably well with other sequences of steps and functions to provide data processing in other applications.

Although the invention has been described in considerable detail with reference to certain embodiments, other embodiments are possible. As will be understood by those of skill in the art, the invention may be embodied in other specific forms without departing from the essential characteristics thereof. Accordingly, the present invention is intended to embrace all such alternatives, modifications and variations as fall within the spirit and scope of the appended claims and equivalents.

What is claimed is:

1. A method of direct memory access control, comprising:
receiving a command to initiate data transfer between a first device and a second device;
responsive to the command received, determining a channel capable of facilitating the data transfer;
determining a mode indicating a manner in which to activate the channel;
responsive to the data transfer comprising data transfer of a plurality of data segments, determining a segment count indicator and a segment spacing indicator from operational characteristics associated with the data transfer; and
enabling the data transfer to be performed using the channel and based on the mode determined.

2. The method according to claim 1, wherein the one of the first device and the second device comprises a memory device.

3. The method according to claim 1, further comprising:
receiving a signal indicating a last transfer associated with the data transfer; and
in response, transmitting a signal acknowledging completion of the data transfer.

4. The method according to claim 1, wherein determining a mode indicating a manner in which to activate the channel comprises:
selecting the mode from one of a group of operation modes comprising a fixed length single burst mode, a chaining mode, an auto-rollback mode, virtual channel mode, and a multiple-segment mode.

5. The method according to claim 1, wherein determining a mode indicating a manner in which to activate the channel comprises:
selecting the mode from one of a group of access modes comprising READ and WRITE modes.

6. The method according to claim 1, further comprising:
determining a base address representing a starting address of the data transfer.

7. The method according to claim 6, further comprising:
selecting a starting address of a subsequent data transfer to be the base address.

8. The method according to claim 6, further comprising:
selecting a starting address of a subsequent data transfer to be an address that is continuous with an ending address of a previous data transfer.

9. The method according to claim 6, further comprising:
determining an ending address contiguous to the starting address; and
automatically rolling the ending address to the starting address when the data transfer exceeds the ending address.

10. The method according to claim 1, further comprising:
determining a base address representing a starting address of a first data segment;
selecting a starting address of a subsequent data segment to be an address determined from the base address offset based on the segment count indicator and the segment spacing indicator.

11. A method of selectably enabling a plurality of data transfer modes along one or more channels, comprising:
loading predetermined configuration data from an external device, the predetermined configuration data including the plurality of data transfer modes and the channels facilitating the data transfer, the plurality of data transfer modes including a multiple-segment mode for transferring a plurality of data segments;
receiving a command to initiate the data transfer between a source device and a destination device;
responsive to the command received, selecting a corresponding channel from the channels and a corresponding mode from the plurality of data transfer modes;
responsive to the selected data transfer mode being the multiple-segment mode, determining a segment count indicator and a segment spacing indicator from operational characteristics associated with the data transfer; and
enabling data transfer between the source device and the destination device based on the corresponding channel and the corresponding mode.

12. The method according to claim 11, wherein selecting a corresponding mode from the plurality of data transfer modes comprises:
selecting the corresponding mode to be one from a group of operation modes comprising a fixed length single burst mode, a chaining mode, an auto-rollback mode, virtual channel mode, and a multiple-segment mode.

13. The method according to claim 11, wherein selecting a corresponding mode from the plurality of data transfer modes comprises:
selecting the corresponding mode to be one from a group of access modes comprising READ and WRITE modes.

14. The method according to claim 11, wherein one of the source device and the destination device comprises a memory device.

15. The method according to claim 11, wherein enabling data transfer between the source device and the destination device based on the corresponding channel and the corresponding mode comprises:
enabling the source device to read data from the destination device.

16. The method according to claim 11, wherein enabling data transfer between the source device and the destination device based on the corresponding channel and the corresponding mode comprises:
enabling the source device to write data to the destination device.

17. A method of controlling data transfer between a first device and a second device, comprising:
- receiving a command to initiate the data transfer;
- extracting configuration data from the command to load a configuration engine and to index operational characteristics associated with the data transfer, the configuration engine being capable of storing the operational characteristics;
- selecting from the operational characteristics a channel facilitating the data transfer between the first device and the second device, and an operation mode associated with the data transfer;
- responsive to the data transfer comprising data transfer of a plurality of data segments, determining a segment count indicator and a segment spacing indicator from the operational characteristics;
- receiving at least one signal indicating that the data transfer is ready to be undertaken; and
- enabling activation of the channel; and
- enabling the data transfer using the operation mode selected.

18. The method according to claim 17, further comprising:
- receiving a signal indicating a last transfer associated with the data transfer; and
- in response, transmitting a signal acknowledging completion of the data transfer.

19. The method according to claim 17, wherein the second device is memory device.

20. The method according to claim 19, wherein receiving at least one signal indicating that the data transfer is ready to be undertaken comprises:
- receiving a request from the first device to READ data from the memory device.

21. The method according to claim 19, wherein receiving at least one signal indicating that the data transfer is ready to be undertaken comprises:
- receiving a request from the first device to WRITE data to the memory device.

22. The method according to claim 17, further comprising:
- determining a base address representing a starting address of the data transfer.

23. The method according to claim 22, wherein enabling the data transfer using the operation mode selected comprises:
- selecting a starting address of a subsequent data transfer to be the base address.

24. The method according to claim 22, wherein enabling the data transfer using the operation mode selected comprises:
- selecting a starting address of a subsequent data transfer to be an address that is continuous with an ending address of a previous data transfer.

25. The method according to claim 22, wherein enabling the data transfer using the operation mode selected comprises:
- determining an ending address contiguous to the starting address; and
- automatically rolling the ending address to the starting address when the data transfer exceeds the ending address.

26. The method according to claim 17, wherein enabling the data transfer using the operation mode selected comprises:
- determining a base address representing a starting address of a first data segment;
- selecting a starting address of a subsequent data segment to be an address determined from the base address offset based on the segment count indicator and the segment spacing indicator.

27. The method according to claim 17, wherein receiving at least one signal indicating that the data transfer is ready to be undertaken comprises:
- receiving a request from the first device to READ data from the second device; and
- receiving a request from the second device to WRITE data to the first device.

28. The method according to claim 27, wherein the operation mode comprises a virtual channel data transfer mode, and wherein enabling the data transfer using the operation mode selected comprises:
- sending an acknowledge signal to each of the first device and the second device; and
- enabling the data transfer to be performed directly between the first device and the second device.

29. A computer program product for controlling data transfer between a first device and a second device, the computer program product stored on a computer readable medium, and adapted to perform operations of:
- allowing receipt of a command to initiate the data transfer;
- allowing configuration data to be extracted from the command to load a configuration engine and to index operational characteristics associated with the data transfer, the configuration engine being capable of storing the operational characteristics;
- enabling selection from the operational characteristics of a channel facilitating the data transfer between the first device and the second device, and an operation mode associated with the data transfer;
- responsive to the data transfer comprising data transfer of a plurality of data segments, determining a segment count indicator and a segment spacing indicator from the operational characteristics;
- allowing receipt of at least one signal indicating that the data transfer is ready to be undertaken;
- enabling activation of the channel; and
- enabling the data transfer using the operation mode selected.

30. A computer program product for selectably enabling a plurality of data transfer modes along one or more channels, the computer program product stored on a computer readable medium, and adapted to perform operations of:
- allowing predetermined configuration data to be loaded from an external device, the predetermined configuration data including the plurality of data transfer modes and the channels facilitating the data transfer, the plurality of data transfer modes including a multiple-segment mode for transferring a plurality of data segments;
- enabling receipt of a command to initiate the data transfer between a source device and a destination device;
- responsive to the command received, enabling selection of a corresponding channel from the channels and a corresponding mode from the plurality of data transfer modes;
- responsive to the selected data transfer mode being the multiple-segment mode, determining a segment count indicator and a segment spacing indicator from operational characteristics associated with the data transfer; and enabling data transfer between the source device and the destination device based on the corresponding channel and the corresponding mode.

31. A computer program product for direct memory access control, the computer program product stored on a computer readable medium, and adapted to perform operations of:

allowing receipt of a command to initiate data transfer between a first device and a second device;

responsive to the command received, enabling determination to be made of a channel capable of facilitating the data transfer;

enabling determination of a mode indicating a manner in which to activate the channel;

responsive to the data transfer comprising data transfer of a plurality of data segments, determining a segment count indicator and a segment spacing indicator from operational characteristics associated with the data transfer; and enabling the data transfer to be performed using the channel and based on the mode determined.

32. A method of controlling data transfer between a first device and a second device, comprising:

allowing receipt of a command to initiate the data transfer;

enabling configuration data to be extracted from the command to load a configuration engine and to index operational characteristics associated with the data transfer, the configuration engine being capable of storing the operational characteristics;

allowing a channel to be selected from the operational characteristics, the channel facilitating the data transfer between the first device and the second device, and an operation mode associated with the data transfer;

responsive to the data transfer comprising data transfer of a plurality of data segments, determining a segment count indicator and a segment spacing indicator from the operational characteristics;

allowing receipt of at least one signal indicating that the data transfer is ready to be undertaken;

enabling activation of the channel; and enabling the data transfer using the operation mode selected.

33. The method according to claim 32, further comprising:

allowing receipt of a signal indicating a last transfer associated with the data transfer; and in response, enabling transmission of a signal acknowledging completion of the data transfer.

* * * * *